United States Patent
Chung et al.

(10) Patent No.: US 8,169,201 B2
(45) Date of Patent: May 1, 2012

(54) OUTPUT COMPENSATOR FOR A REGULATOR

(75) Inventors: Shu Hung Henry Chung, Hong Kong (HK); Wai To Yan, Taipo (HK)

(73) Assignee: City University of Hong Kong, Kowloon (HK)

( * ) Notice: Subject to any disclaimer, the term of this patent is extended or adjusted under 35 U.S.C. 154(b) by 441 days.

(21) Appl. No.: 12/435,979

(22) Filed: May 5, 2009

(65) Prior Publication Data

US 2010/0283438 A1  Nov. 11, 2010

(51) Int. Cl.
*G05F 3/04* (2006.01)
*G05F 3/08* (2006.01)
*G05F 1/00* (2006.01)

(52) U.S. Cl. .......... 323/268; 323/312
(58) Field of Classification Search .......... 323/268, 323/312, 368
See application file for complete search history.

(56) References Cited

U.S. PATENT DOCUMENTS

| | | | |
|---|---|---|---|
| 1,920,948 A | 8/1933 | Crouse | 178/44 |
| 5,038,263 A | 8/1991 | Marrero et al. | 363/20 |
| 5,668,464 A * | 9/1997 | Krein et al. | 323/259 |
| 6,476,689 B1 | 11/2002 | Uchida et al. | 333/177 |
| 6,937,115 B2 | 8/2005 | Perreault et al. | 333/177 |
| 7,180,389 B2 | 2/2007 | Wang et al. | 333/181 |
| 7,242,269 B2 | 7/2007 | Perreault et al. | 333/177 |
| 2007/0188265 A1 | 8/2007 | Perreault et al. | 333/181 |
| 2008/0204126 A1 | 8/2008 | Wang et al. | 327/551 |
| 2008/0205095 A1 * | 8/2008 | Pinon et al. | 363/39 |

FOREIGN PATENT DOCUMENTS

WO  WO 2007/094921  8/2007

OTHER PUBLICATIONS

Erickson, R.W. and Maksimovic, D., "Fundamentals of Power Electronics," Norwell, Mass., Kluwer Academic, c2001.
Krein, P. T., "Nonlinear Phenomena in Power Electronics: Attractors, Bifurcation, Chaos, and Nonlinear Control," New York, IEEE Press, 2001, Chap. 8.
Mattingly, Doug, "Designing Stable Compensation Networks for Single Phase Voltage Mode Buck Regulators," Intersil Technical Brief TB 417.1, Dec. 2003.

(Continued)

*Primary Examiner* — Adolf Berhane
*Assistant Examiner* — Emily Pham
(74) *Attorney, Agent, or Firm* — Heslin Rothenberg Farley & Mesiti P.C.

(57) ABSTRACT

An output compensator for a regulator is provided that can improve the dynamic response of a regulator, and which does not require the redesigning of the power conversion stage or control stage of the regulator, but simple circuit connection of the compensator circuit to the output stage of the regulator. The compensator senses an output signal at a passive component at an output of the regulator; generates a compensating signal based on a difference signal, the difference being a difference between a level of a reference signal for the regulator and the sensed output signal; and applies the compensating signal to the passive output component to reduce the difference between the level of the reference signal and the sensed output signal. The passive output component may be, for example, a capacitor or an inductor, depending on the operation of the regulator.

21 Claims, 15 Drawing Sheets

OTHER PUBLICATIONS

Farkas, et al., "Viability of Active EMI Filters for Utility Applications," IEEE Transactions on Power Electronics, vol. 9, No. 3, May 1994, pp. 328-337.

Hamill, David C., "An Efficient Active Ripple Filter for Use in DC-DC Conversion," IEEE Transactions on Aerospace Electronic System, vol. 32, No. 3, Jul. 1996, pp. 1077-1084.

Lin, Y. H., Zheng, K. L., and Chen, K. H., "Smooth Pole Tracking Technique by Power MOSFET Array in Low-Dropout Regulators," IEEE Trans. Power Electron., vol. 23, No. 5, Sep. 2008, pp. 2421-2427.

Lu, B. and Ooi, B., "Nonlinear Control of Voltage-Source Converter Systems," IEEE Trans. Power Electron., vol. 22, No. 4, Jul. 2007, pp. 1186-1195.

Ogasawara, et al., "An Active Circuit for Cancellation of Common-Mode Voltage Generated by a PWM Inverter," IEEE Transactions on Power Electronics, vol. 13, No. 5, Sep. 1998, pp. 835-841.

Poon, et al., "Techniques for Input Ripple Current Cancellation: Classification and Implementation," IEEE Transactions on Power Electronics, vol. 15, No. 6, Nov. 2000, pp. 1144-1152.

Smedley, K. M. and Ćuk, S., "One-cycle control of switching converters," IEEE Trans. Power Electron., vol. 10, No. 6, Nov. 1995, pp. 625-633.

Vlatković, et al., "Input Filter Design for Power Factor Correction Circuits," IEEE Transactions on Power Electronics, vol. 11, No. 1, Jan. 1996, pp. 199-205.

Wang, et al., "Common-Mode Noise Reduction for Power Factor Correction Circuit With Parasitic Capacitance Cancellation," IEEE Transactions on Electromagnetic Compatibility, vol. 49, No. 3, Aug. 2007, pp. 537-542.

Wang, et al., "Design of Inductor Winding Capacitance Cancellation for EMI Suppression," IEEE Transactions on Power Electronics, vol. 21, No. 6, Nov. 2006, pp. 1825-1832.

Wang, et al., "Inductor Winding Capacitance Cancellation Using Mutual Capacitance Concept for Noise Reduction Application," IEEE Transactions on Electromagnetic Compatibility, vol. 48, No. 2, May 2006, pp. 311-318.

\* cited by examiner

PRIOR ART

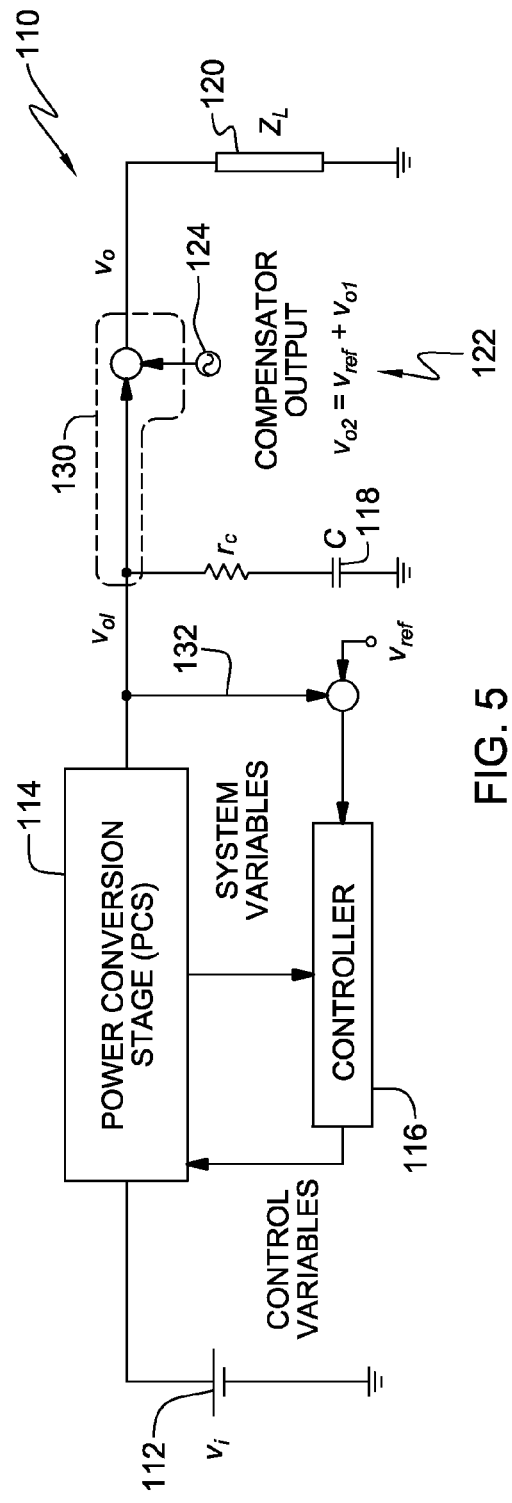
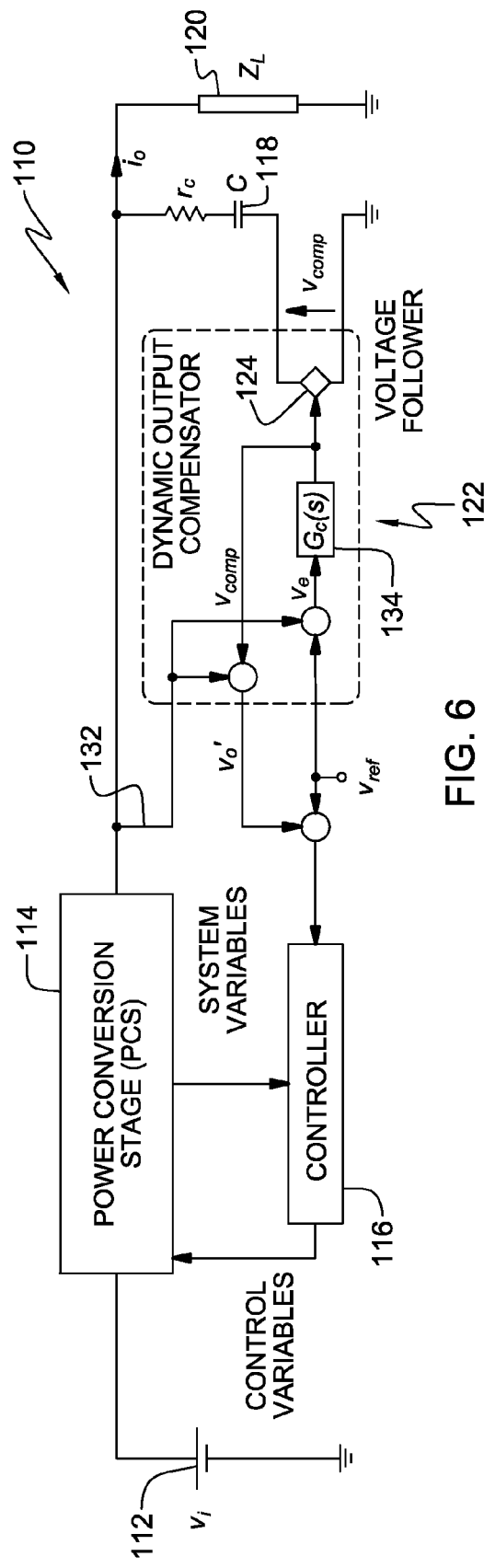
FIG. 5
FIG. 6

PRIOR ART

(a) WITHOUT THE COMPENSATOR (b) WITH THE COMPENSATOR (a) WITHOUT THE COMPENSATOR ($V_o$ : 200mV/div)

(b) WITH THE COMPENSATOR ($V_a$ : 100% V/div)

(a) WITHOUT THE COMPENSATOR ($v_o$: 200mV/div).

(b) WITH THE COMPENSATOR ($V_a$: 100m V/div).

OUTPUT COMPENSATOR FOR A REGULATOR

CROSS-REFERENCE TO RELATED APPLICATIONS

This application contains subject matter which is related to the subject matter of the following applications, each of which is assigned to the same assignee as this application and filed on the same day as this application. Each of the below listed applications is hereby incorporated herein by reference in its entirety:

Patent application Ser. No. 12/435,941, by CHUNG et al., entitled "METHOD AND APPARATUS FOR SUPPRESSING NOISE CAUSED BY PARASITIC CAPACITANCE AND/OR RESISTANCE IN AN ELECTRONIC CIRCUIT OR SYSTEM"; and Patent application Ser. No. 12/435,954, by CHUNG et al., entitled "METHOD AND APPARATUS FOR SUPPRESSING NOISE CAUSED BY PARASITIC INDUCTANCE AND/OR RESISTANCE IN AN ELECTRONIC CIRCUIT OR SYSTEM".

FIELD OF THE INVENTION

The invention relates to an output compensator for a voltage or current regulator and, in particular, to an output compensator circuit that can improve the dynamic response of a voltage or current regulator, but which does not require the redesigning of the power conversion stage or control stage of the regulator, but merely requires simple circuit connection of the compensator circuit to the output stage of the regulator. Furthermore, the invention relates to an output compensator circuit that is not required to process the whole of the load power of the regulator and thus is a low power circuit relative to the power rating of the regulator.

BACKGROUND OF THE INVENTION

Linear regulators are commonly used for step-down (e.g. the output supply voltage is lower than input source voltage) applications.

An advantage of integrated circuit 'IC' linear regulators is simple implementation and minimal parts and low output signal ripple, although output signal ripple is still present. A disadvantage of linear regulators is low efficiency. Significant power is dissipated within the linear regulator IC, as the converter is constantly on and conducting current. Linear regulators are normally used when the difference between input source voltage and output supply voltage is minimal, and converter efficiency is not a concern.

Switching voltage regulators are commonly used for both step-up and step-down applications, and differ from linear regulators by means of pulse-width modulation (PWM) implementation. Switching regulators control the output voltage by using a current switch with a constant frequency and variable duty-cycle. Switching frequencies are generally from a few kHz to a few MHz. The switch duty-cycle ratio determines how much and how quickly the output supply voltage increases or decreases, depending on the load state and input source voltage. Some switching regulators utilize both variable switching frequency and duty-cycle.

An advantage of switching regulators is efficiency, as minimal power is dissipated in the power path (often FET switches) when the output supply voltage is sufficient for the load state. Essentially, the power converter "shuts off" when power is not needed, due to minimal switch duty-cycle. A disadvantage of switching regulators is complexity, as several external passive components are required.

Regulators of both types suffer from output signal ripple, which may be handled with bypass capacitance and/or inductance near at least the load. However, the use of passive components such as capacitors and/or inductors at the output does not fully resolve the problem of output signal ripple due to the capacitance or inductance characteristics of the passive components themselves and/or other circuit effects.

A voltage regulator is designed to maintain a constant voltage level within a specified tolerance range, even when the load current varies. FIG. 1 shows a structure of a typical switching voltage regulator 10. It comprises a power supply 12, a power conversion stage (PCS) 14 and a controller stage 16. The controller stage 16 senses the output voltage $v_o$ of the voltage regulator 10, compares it with a reference $v_{ref}$ of the voltage regulator, receives some system variables such as inductor current, switch voltage, switch current, etc., and uses these to derive a control signal to command a control variable, typically duty cycle, to the PCS 14, so as to regulate $v_o$ to converge it to $v_{ref}$. In this example of a typical voltage regulator, there is provided an output passive component comprising a capacitor 'C' 18 connected in parallel with a load impedance '$Z_L$' 20 of the voltage regulator 10. A linear regulator has a similar construction and mode of operation although it will be understood that the PCS of a linear regulator does not have an inductor, a switch voltage and a switch current, but instead has a power transistor operating in linear mode only.

Since the 1970's, many research articles have been devoted to different control schemes such as voltage-mode control, current-mode control, nonlinear control, one-cycle control, sliding-mode control, etc. for the controller. To further improve voltage regulation capability and dynamic response, low dropout regulators (LDRs) have been widely used in post regulation of switching regulators. LDRs are linear regulators operating with very small input-output differential voltage. Although they have low power loss, they necessitate processing the entire load power of the voltage regulator. The series pass element in the LDRs has to carry the whole of the voltage regulator load current. Consequently, LDRs as a means of compensating the output signal of a voltage regulator are more suitable for low-power voltage regulation applications.

OBJECTS OF THE INVENTION

An object of the invention is to provide an improved compensator circuit for a voltage or current regulator.

Another object of the invention is to mitigate or obviate to some degree one or more problems associated with known methods of compensating the output signal of a voltage or current regulator.

Yet another object of the invention is to provide an output compensator for a voltage or current regulator which does not process the whole of the load power of the voltage regulator output signal.

Yet a further object of the invention is to provide a compensator for a voltage or current regulator that can be easily connected to an output stage of the voltage regulator.

Yet another object of the invention is to provide a compensator for a voltage or current regulator that is not limited to low power applications.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect of the invention, there is provided a method of compensating an output signal of a regulator. The method comprises sensing an output signal at a passive component at an output of the regulator, generating a ripple compensating signal based on a difference signal, the difference signal comprising a difference between a level of a reference signal for the regulator and the sensed output signal, and applying said ripple compensating signal to said passive output component to thereby reduce a ripple signal comprising said difference between the level of the reference signal and the sensed output signal to provide a compensated output signal for the regulator, wherein a compensator circuit for generating the ripple compensating signal does not have to process a whole of an output load power of the regulator.

One advantage of this arrangement is that a compensator circuit for generating the compensating signal does not have to process the whole of the output load power of the regulator.

Preferably, the step of generating the compensating signal includes amplifying the difference signal. This improves the efficiency of the compensator circuit and further reduces its power rating.

The sensed output signal may comprise a voltage signal sensed across an output capacitor component of said regulator, said output capacitor component being arranged in parallel with an output load impedance of said regulator.

The compensating signal may comprise a voltage compensation signal applied in series to said output capacitor component. In some examples, a current source may be used.

The voltage compensation signal may be provided by a linear-type voltage source. This is advantageous for low power applications.

The voltage compensation signal may be provided by a switching-type voltage source. This is advantageous for high power applications, because of the high conversion efficiency of the switching-type voltage source.

Alternatively, the sensed output signal comprises a signal sensed at an output of an output inductor component of said regulator, said output inductor component being arranged in series with an output load impedance of said regulator. The compensator circuit of the present invention is advantageous in that it can be employed with any type of passive output component.

The compensating signal may comprise a current compensation signal applied in parallel to and/or to an output of said output inductor component.

The current compensation signal may be provided by a linear-type current source, although in some examples a linear-type voltage source may be employed.

The regulator may comprise a linear type voltage regulator.

Alternatively, the regulator may comprise a switched type voltage regulator.

The compensation signal may be applied to the output passive component following a reference signal feedback loop of the regulator. This is advantageous in that it is unnecessary to change or alter the control feedback loop or the controller stage of the regulator. Furthermore, it simplifies connection of the compensator circuit to the output stage of the regulator.

Preferably, the regulator comprises part of a switched mode power supply.

The switched mode power supply may be a power supply for an electronic device such as a laptop computer, a mobile communication device, a personal digital assistance device, etc.

The regulator may comprise part of a dual power source electronic device, said device having a battery power supply and a main power supply and means to switch between said power supplies.

The regulator with compensator circuit may be provided on a same IC.

Alternatively, the compensator circuit may be provided as a separate circuit arranged for connection to the regulator circuit. This arrangement enables a legacy device to be updated by simple connection of the compensator circuit to the regulator of the legacy device.

In a second main aspect of the invention, there is provided a regulator. The regulator comprises a power conversion stage, and a controller circuit having means for sensing an output signal of the regulator and comparing it to a reference signal of the regulator to generate a control signal for controlling the power conversion stage so as to regulate the output signal of the regulator to converge to a level of the reference signal. The regulator also comprises a compensator circuit having means for sensing an output signal at a passive component at the output of the regulator, means for generating a ripple compensating signal based on a difference signal, the difference signal comprising a difference between a level of the reference signal and the sensed output signal, and means for applying the ripple compensating signal to the passive component to thereby reduce a ripple signal comprising the difference between the level of the reference signal and the sensed output signal to provide a compensated output signal for the regulator, the compensator circuit being configured such that the compensator circuit does not have to process a whole of an output load power of the regulator.

Preferably, the means for generating the compensating signal is arranged to amplify the difference signal.

The sensed output voltage may comprise a voltage signal sensed across an output capacitor component of said regulator, said output capacitor component being arranged in parallel with an output load impedance of said regulator.

The compensating signal may comprise a voltage compensation signal applied in series to said output capacitor component.

The voltage compensation signal may comprise a linear-type voltage source.

The voltage compensation signal may comprise a switching-type voltage source. Alternatively, the sensed output signal comprises a signal sensed at an output of an output inductor component of said regulator, said output inductor component being arranged in series with an output load impedance of said regulator.

The compensating signal may comprise a current compensation signal applied in series to said output inductor component.

The current compensation signal may comprise a linear-type current source.

The regulator may comprise a linear type voltage regulator.

Alternatively, the regulator may comprise a switched type voltage regulator.

The compensation signal may be applied to the output passive component following a reference signal feedback loop of the regulator.

Preferably, the regulator comprises part of a switched mode power supply.

The switched mode power supply may be a power supply for an electronic device such as a laptop computer, a mobile communication device, a personal digital assistance device, etc.

The regulator with compensator circuit may comprise a single IC. Alternatively, the compensator circuit may comprise a separate circuit arranged for connection to the regulator circuit.

According to another main aspect of the invention, there is provided a compensator circuit for a regulator having means for sensing an output signal at a passive component at an output of the regulator, means for generating a ripple compensating signal based on a difference signal, the difference signal comprising a difference between a level of a reference signal for the regulator and the sensed output signal, and means for applying the ripple compensating signal to the passive component to thereby reduce a ripple signal comprising the difference between the level of the reference signal and the sensed output signal, the compensator circuit being configured such that the compensator circuit does not have to process a whole of an output load power of the regulator.

According to yet another main aspect of the invention, there is provided a method of forming a regulator having a power conversion stage and a controller circuit having means for sensing an output signal of the regulator and comparing it to a reference signal of the regulator to generate a control signal for controlling the power conversion stage so as to regulate the output signal of the regulator to converge to a level of the reference signal. The method comprises providing an output compensator circuit having an input for receiving the reference signal from the regulator, an input for receiving the sensed output signal of the regulator, within the compensator circuit, generating a ripple compensating signal based on a difference signal, the difference signal comprising a difference between a level of the reference signal for the regulator and the sensed output signal, and connecting an output of the compensator circuit to a passive component at the output of the regulator in order to apply the ripple compensating signal to the passive component to thereby reduce a ripple signal comprising the difference between the level of the reference signal and the sensed output signal, the compensator circuit being configured such that the compensator circuit does not have to process a whole of an output load power of the regulator.

According to yet a further main aspect of the invention, there is provided a compensator circuit for a regulator comprising an input for receiving a reference signal from the regulator, an input for receiving a sensed output signal of the regulator, a signal generating circuit for generating a ripple compensating signal based on a difference signal, the difference signal comprising a difference between a level of the reference signal for the regulator and the sensed output signal, and an output for connecting to a passive component at the output of the regulator in order to apply the ripple compensating signal to the passive component to thereby reduce a ripple signal comprising the difference between the level of the reference signal and the sensed output signal, the compensator circuit being configured such that the compensator circuit does not have to process a whole of an output load power of the regulator.

According to yet a further main aspect of the invention, there is provided a switched mode power supply having a regulator according to the second main aspect of the invention.

According to yet a further main aspect of the invention, there is provided an electronic device having at least one regulator according to the second main aspect of the invention.

BRIEF DESCRIPTION OF THE DRAWINGS

The foregoing and further features of the present invention will be apparent from the following description of preferred examples which are provided by way of example only in connection with the accompanying figures, of which:

FIG. 5 illustrates in more detail the structure of the first example of a regulator according to the invention as depicted in FIG. 2;

FIG. 6 illustrates a practical implementation of the regulator example of FIG. 5;

DESCRIPTION OF PREFERRED EMBODIMENTS

The following description makes reference to a 'voltage regulator'. It should be noted that some voltage regulators are also commonly referred to as DC (Direct current) to DC converters and, as such, the term 'voltage regulator' as used herein is considered to also comprise a DC to DC converter. Furthermore, the present invention is equally applicable to current regulators and to voltage and current regulators having an AC output circuit.

Figure 1:
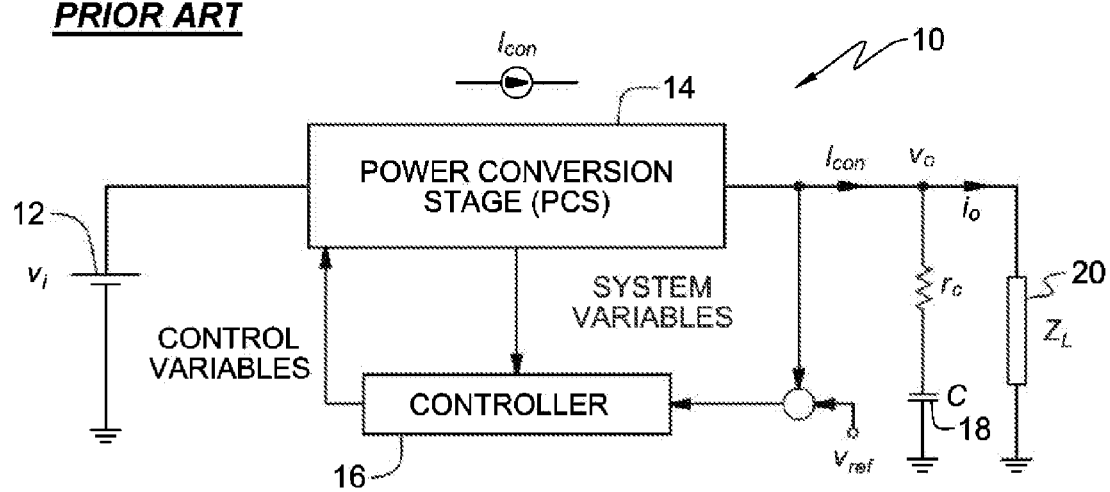
FIG. 1 illustrates the structure of a typical switched type voltage regulator circuit.
Figure 2:
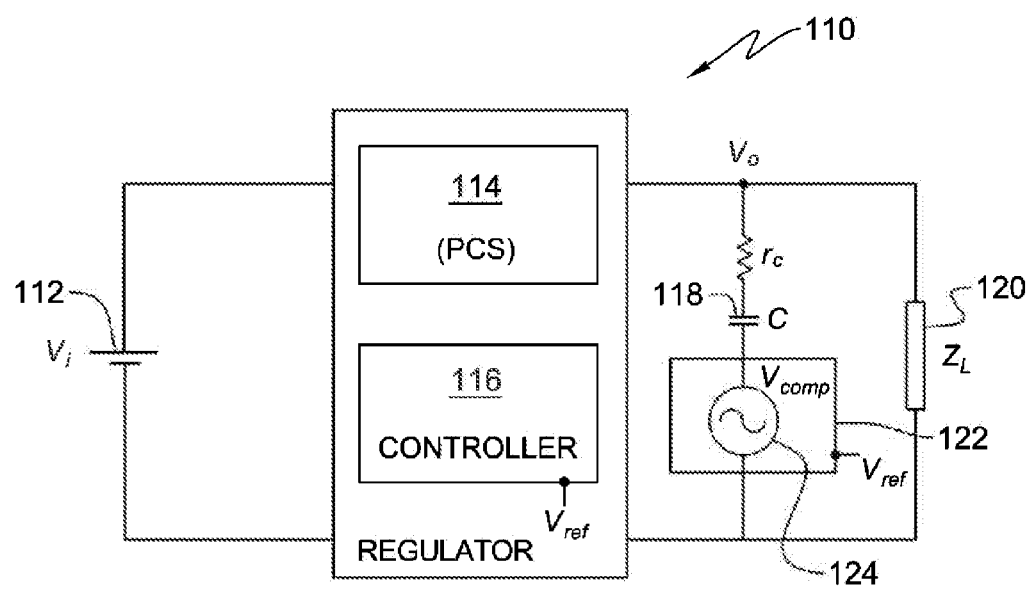
FIG. 2 illustrates the structure of a first example of a regulator according to the invention.

FIG. 2 illustrates the basic concept of an output compensation method in accordance with the invention applied to an output signal of a first example of a regulator according to the invention, said regulator comprising a voltage regulator in this example. In the following description, like numerals to those already employed to describe the typical voltage regulator of FIG. 1 will be used to denote like parts, but preceded by the numeral '1'.

The voltage regulator 110 of FIG. 2 comprises a power source $v_i$ 112, a power conversion stage (PCS) 114, a controller stage 116, a compensator circuit 122 and a passive output component comprising a capacitor C 118 (shown in FIG. 2 with its equivalent circuit resistance $r_c$). The capacitor 118 is positioned at an output of the voltage regulator 110 in series with a voltage source 124 of the compensator circuit 122. The capacitor 118 is arranged in parallel with a load impedance '$Z_L$' 120 of the voltage regulator. The capacitor 118 may form part of an LC filter circuit at the output of the voltage regulator 110. The capacitor is a circuit element that stores electrical charge. It is used in the illustrated arrangement to help keep the voltage regulator's output voltage $v_o$ generally constant over time, although an output ripple will usually still be present in the output voltage signal in the absence of any application of a compensation signal from the compensator circuit 122.

Figure 3:
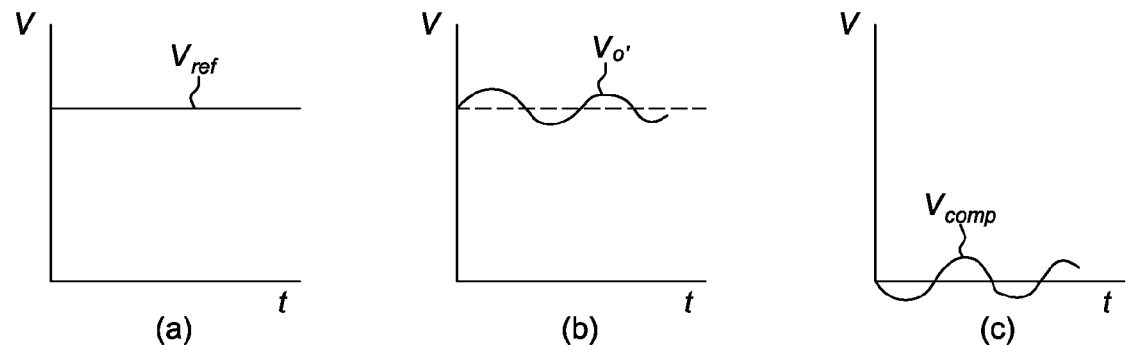
FIGS. 3a to 3c illustrate respectively the reference voltage signal $v_{ref}$, the output voltage signal $v_o$, absent compensation and the compensation voltage signal $v_{comp}$ of the voltage regulator of FIG. 2.

The compensator circuit 122, which may in some examples comprise an active device formed on an integrated circuit 'IC', is arranged to monitor or sense an output voltage signal $v_o$ (initially an uncompensated output voltage $v_{o'}$ signal in the absence of any compensation) across the capacitor 118 and to compare the sensed output voltage signal $v_o$ to a reference voltage signal $v_{ref}$ of the voltage regulator 110. The reference voltage signal $v_{ref}$ of the voltage regulator 110 is a target voltage signal to which it is desired to converge the output voltage signal $v_o$ of the voltage regulator 110. As such and as shown in FIG. 3a, the reference voltage signal $v_{ref}$ has a constant, fixed value over time, although in some examples the constant value of the reference voltage $v_{ref}$ may be variable. However, such variation is not normally dynamic, but occurs at discrete points of time and may be manually implementable.

In the absence of any application of a compensation signal $v_{comp}$ from the compensator circuit 122, the voltage regulator 110 of FIG. 2 will have an output voltage signal $v_{o'}$ that generally tracks the constant level of the reference voltage signal $v_{ref}$. However, due to the operation of the capacitor and/or other circuit effects, a ripple voltage signal is often present in the output voltage signal $v_{o'}$ as illustrated in FIG. 3b. The presence of the ripple voltage signal is undesirable.

The compensator circuit 122 is arranged to derive a difference level signal from the comparison of the reference voltage signal $v_{ref}$ of the voltage regulator to the sensed or monitored output voltage signal $v_o$ of the voltage regulator 110. The compensator circuit 122 is arranged to generate a compensation signal $v_{comp}$ based on said difference level signal and to apply said compensation signal $v_{comp}$ to said capacitor 118. In this example, the compensation signal is provided by a linear-type voltage source 124 of the compensator circuit 122 connected in series with the capacitor 118. Application of the compensation signal to the capacitor 118 results in a compensated output voltage signal $v_o$. The compensation signal $v_{comp}$ as illustrated in FIG. 3c is an inverse of the output voltage signal $v_o$ minus the reference signal $v_{ref}$ namely:

$$v_{comp} = v_{ref} - v_o$$

It will be understood by one skilled in the art that, although the compensation signal $v_{comp}$ is described as being provided by a linear-type voltage source, any suitable voltage source can be utilized or, in some examples, a current source may be employed.

In the improved voltage regulator arrangement of FIG. 2, the controller stage 116 senses the compensated output voltage signal $v_o$ of the voltage regulator 110, compares it with the reference voltage signal $v_{ref}$ of the voltage regulator 110, receives some system variables such as inductor current, switch voltage, switch current, etc, and uses these to derive a control signal to command a control variable, typically duty cycle, to the PCS 114, so as to regulate $v_o$ to it converge to $v_{ref}$. Therefore, the linear-type voltage source 124 of the compensator circuit 122 applies a compensation signal in series to the capacitor 118, said compensating signal having a magnitude generally the same as the ripple voltage signal superimposed by circuit effects on the output voltage signal, but having a generally opposite phase. In addition, the compensated output signal $v_o$ is received as an input to the controller stage 116 and used in a comparison to the reference voltage signal $v_{ref}$ to derive the control variable for controlling the voltage regulator 110 to track the reference voltage signal $v_{ref}$. Consequently, the dual effects of using the compensation signal to counter the ripple voltage signal in the output voltage signal and using the compensation signal as an input to the controller stage 116 for determining the control signal enables the output voltage signal of the voltage regulator 110 to quickly and stably converge to the level of the voltage reference signal $v_{ref}$.

Figure 4:
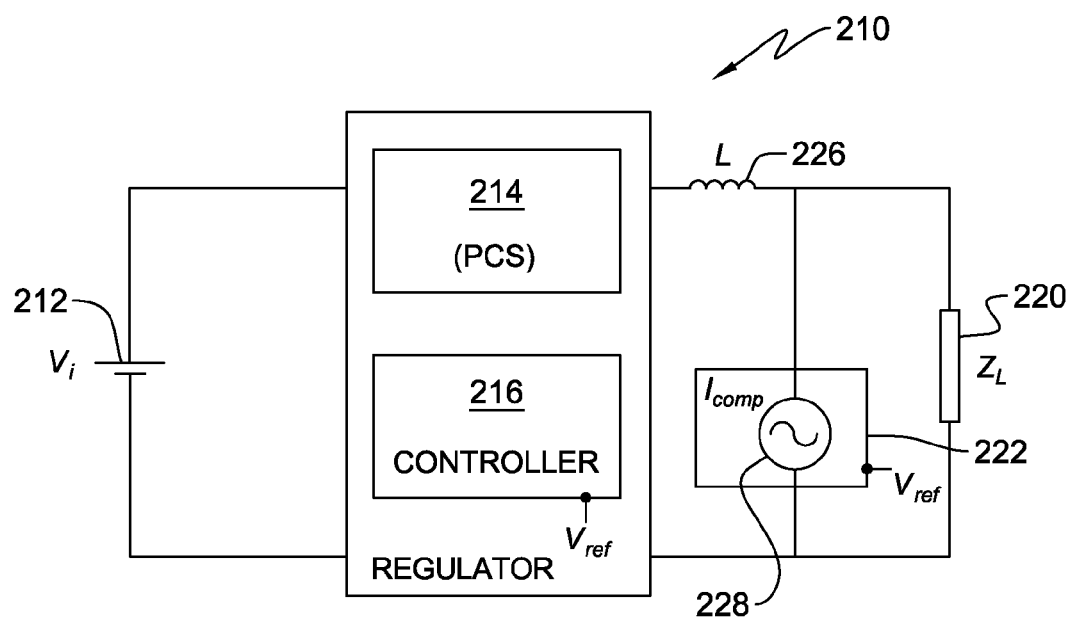
FIG. 4 illustrates the structure of a second example of a regulator according to the invention.

FIG. 4 also illustrates the basic concept of an output compensation method in accordance with the invention applied to an output signal of a second example of a regulator according to the invention, said regulator comprising a current regulator in this example. In the following description, like numerals to those already employed to describe the typical switched type voltage regulator of FIG. 1 will be used to denote like parts, but preceded by the numeral '2'.

The current regulator 210 of FIG. 4 is similar to that of FIG. 2 in that it comprises a power source $v_i$ 212, a power conversion stage (PCS) 214, a controller stage 216, a compensator circuit 222 and a passive output component at the output of the current regulator 210. However, the passive component in this example comprises an inductor L 226. The inductor 226 is positioned at the output of the current regulator 210. The inductor 226 is arranged in series with a load impedance '$Z_L$' 220 of the current regulator and with a current source 228 of the compensator circuit 222 connecting its output. The current source 228 of the compensator circuit 222 is arranged in parallel with the load impedance 220. The inductor 226 serves as a current source to the output load impedance 220. It is used in the illustrated arrangement to help keep the current regulator's output current generally constant over time, although an output ripple will usually still be present in the output current signal in the absence of any application of a compensation signal from the compensator circuit 222.

The compensator circuit 222, which may in some examples comprise an active device formed on an integrated circuit 'IC', is arranged to monitor or sense an output current signal $i_o$ (initially an uncompensated output current $i_{o'}$ signal in the absence of any compensation) at the output of the inductor 226 and to compare the sensed output current signal $i_o$ to a reference current signal $i_{ref}$ of the current regulator 210.

In the absence of any application of a compensation signal $I_{comp}$ from the compensator circuit 222, the current regulator 210 of FIG. 4 will have an output current signal $i_{o'}$ that generally tracks the constant level of the reference current signal $I_{ref}$. However, due to the operation of the inductor 226 and/or other circuit effects, a ripple current signal is often present in the output current signal $i_{o'}$ in an analogous manner to that illustrated in FIG. 3b. The presence of the ripple current signal is undesirable.

The compensator circuit 222 is arranged to derive a difference level signal from the comparison of the reference current signal $I_{ref}$ of the current regulator to the sensed or monitored output current signal $i_o$ of the current regulator 210. The compensator circuit 222 is arranged to generate a compensation signal $I_{comp}$ based on said difference level signal and to apply said compensation signal $I_{comp}$ to said inductor 226. In this example, the compensation signal is provided by a linear-type current source 228 of the compensator circuit 222 connected to an output of the inductor 226. Application of the compensation signal to the inductor 226 results in a compensated output current signal $i_o$. The compensation signal $I_{comp}$ is an inverse waveform signal of the output current signal $i_o$ minus the reference signal $I_{ref}$ namely:

$I_{comp}$ is proportional to $I_{ref}-i_o$.

It will be understood by one skilled in the art that, although the compensation signal $I_{comp}$ is described as being provided by a linear-type current source, any suitable current source can be utilized or, in some examples, a voltage source may be employed.

In the improved current regulator arrangement of FIG. 4, the controller stage 216 senses the compensated output current signal $i_o$ of the current regulator 210, compares it with the reference current signal $I_{ref}$ of the current regulator 210, receives some system variables such as inductor current, switch voltage, switch current, etc, and uses these to derive a control signal to command a control variable, typically duty cycle, to the PCS 214, so as to regulate $i_o$ to it converge to $I_{ref}$. Therefore, the linear-type current source 228 of the compensator circuit 222 applies a compensation signal to an output of the inductor 226, said compensating signal having a generally opposite phase to that of the ripple current signal superimposed by circuit effects on the output current signal. In addition, the compensated output signal $i_o$ is received as an input to the controller stage 216 and used in a comparison to the reference current signal $I_{ref}$ to derive the control variable for controlling the current regulator 210 to track the reference current signal $I_{ref}$. Consequently, the dual effects of using the compensation signal to counter the ripple current signal in the output current signal and using the compensation signal as an input to the controller stage 216 for determining the control signal enables the output current signal of the current regulator 210 to quickly and stably converge to the level of the current reference signal $v_{ref}$.

It can be seen therefore that the first and second examples of a voltage/current regulator in accordance with the invention provide at least a method of compensating an output signal of a regulator, wherein said method comprises the steps of sensing an output signal at a passive component at an output of the regulator; generating a compensating signal based on a difference signal, said difference signal comprising a difference between a level of a reference signal for the regulator and the sensed output signal; and applying said compensating signal to said passive output component to reduce said difference between the level of the reference signal and the sensed output signal.

Furthermore, the first and second examples of a voltage/current regulator in accordance with the invention provide at least a regulator comprising: a power conversion stage; a controller circuit having means for sensing an output signal of the regulator and comparing it to a reference signal of the regulator to generate a control signal for controlling the power conversion stage so as to regulate the output signal of the regulator to converge to a level of the reference signal; and a compensator circuit having: means for sensing an output signal at a passive component at the output of the regulator; means for generating a compensating signal based on a difference signal, said difference signal comprising a difference between a level of said reference signal and the sensed output signal; and means for applying said compensating signal to said passive output component to reduce said difference between the level of the reference signal and the sensed output signal The first and second examples also provide a power supply embodying means for implementing said method.

FIG. 5 illustrates in more detail the structure of the first example of a voltage regulator according to the invention as depicted in FIG. 2. In the following description, like numerals to those already employed to describe the first example of the voltage regulator of FIG. 2 will be used to denote like parts.

As depicted in FIG. 5, at an input to an output signal summing point 130 of the voltage regulator 110 (i.e. absent any compensation from the compensator circuit 122) there is provided an output voltage signal of $v_{o1}$. The voltage compensator circuit 122 provides a compensating voltage signal of:

$$v_{o2}=(v_{ref}-v_{o1})$$

which when summed with the output voltage signal of $v_{o1}$. results in a compensated output voltage signal of $$v_o=(v_{o1}+v_{o2})=v_{ref}.$$

Consequently, it can be seen that the application of the compensating voltage signal of $v_{o2}$ from the voltage signal source 124 of the compensator circuit 122 does not require any change to the control feedback loop 132 of the voltage regulator 110. Thus, the normal operation of the original voltage regulation mechanism of the voltage regulator 110, that is the feedback loop 132 of the voltage regulator 110, is not affected.

FIG. 6 shows a block diagram of a practical implementation of the output voltage compensation method according to the invention. In the following description, like numerals to those already employed to describe the first example of the voltage regulator of FIGS. 2 and 5 will be used to denote like parts.

Figure 7:
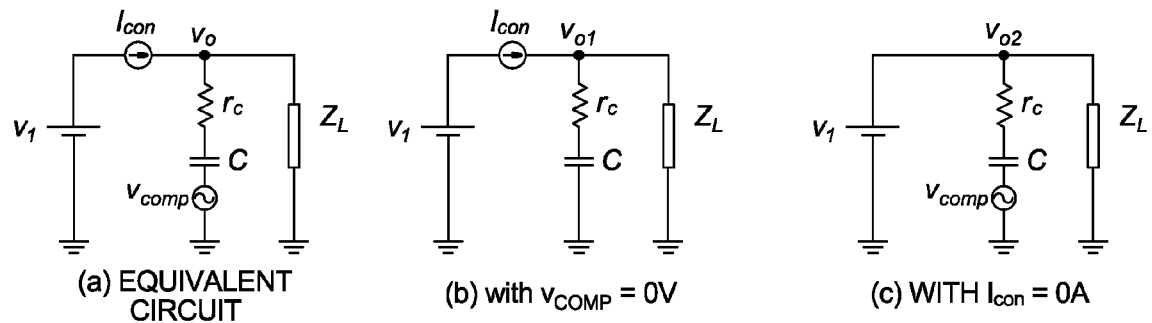
FIGS. 7a to 7c show the equivalent circuits for the example of FIG. 6.

The output voltage signal summing point 130 shown in FIG. 5 is realized by connecting a voltage signal source $v_{comp}$ 124 in series with the output capacitor 118. By using the superposition theorem, it can be seen from FIG. 6 how $v_{o1}$ and $v_{o2}$ are added together to give $v_o$. FIG. 7a shows the equivalent circuit of the entire system, in which the voltage regulator 110 is modeled by a current source $I_{con}$ driving the load 120. FIGS. 7b and 7c show the equivalent circuits with $I_{con}=0$ and $v_{comp}=0$, respectively.

The compensator circuit 122 compares $v_o$ with $v_{ref}$ to give an error or difference voltage signal $v_e$ which is then amplified by an amplifier $G_c(S)$ 134 to provide $v_{comp}$ for compensating $v_o$. The voltage signal $v_{o2}$, which is derived from $v_{comp}$ in FIG. 7c, is obtained by the transfer function $G_{inj}(S)=\hat{v}_{o2}(S)/\hat{v}_{comp}(s)$. The compensator circuit 122 derives a modified output voltage $v_o'$ from $v_o$ and $v_{o2}$ for the controller stage 116.

Figure 8:
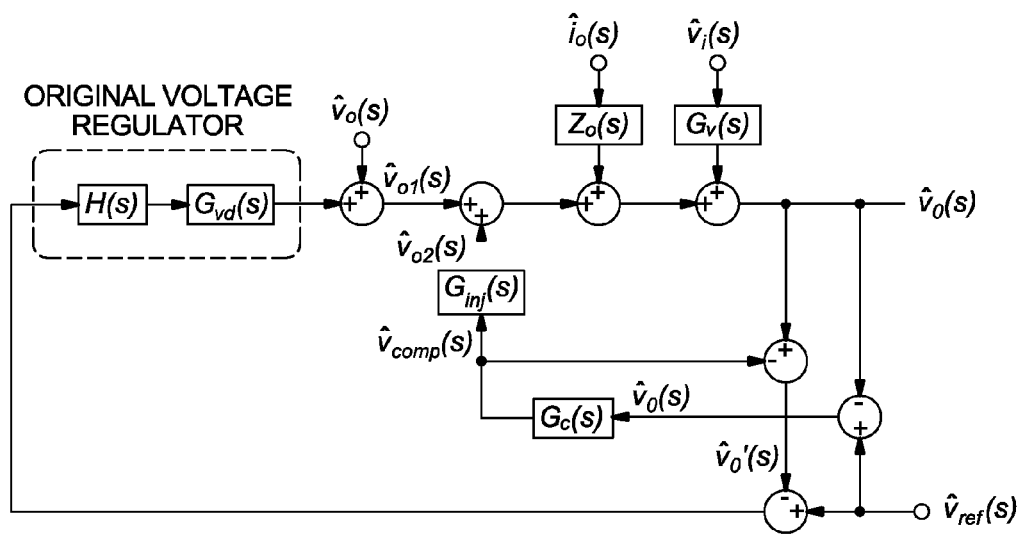
FIG. 8 shows the small signal model of the example of FIG. 6.

FIG. 8 shows the small-signal model of the system. $G_{vd}(S)$ and $H(S)$ are the control-to-output transfer function of the PCS 114 and transfer function of the controller stage 116 in the voltage regulator 110. $Z_o(S)$ and $G_{vi}(S)$ are the open-loop output impedance and input-to-output transfer function of the PCS 114, respectively. $\hat{i}_o(S)$ is the small-signal output current disturbance.

The transfer characteristics of the system can be shown to be equal to:

$$\hat{v}_o(s) = \quad (1)$$

$$\frac{T_L(s)}{1+T_L(s)}\hat{v}_{ref}(s) + \frac{G_{vi}(s)}{1+T_L(s)}\hat{v}_i(s) + \frac{Z_o(s)}{1+T_L(s)}\hat{i}_o(s) + \frac{1}{1+T_L(s)}\hat{v}_n(s)$$

where $T_L(S)=G_{vd}(S)H(S)[1+G_c(S)]+G_c(S)G_{inj}(S)$ is the loop gain of the system.

Compared to the original loop gain $G_{vd}(S)$ H(S) of the original (i.e. non-compensated) voltage regulator 110, the compensator circuit 122 can significantly increase the system bandwidth, reduce the closed-loop output impedance, and improve the input susceptibility. As the compensator circuit 122 is connected in series with the output capacitor 118, $G_{inj}(S)$ is a high-pass filter. It will compensate high-frequency disturbances at the output of the voltage regulator 110 and gives a modified output voltage signal $v_o$' for the voltage regulator 110:

$$v_o' = v_o - G_c(s)(V_{ref} - v_o) \quad (2)$$

$v_o$' is effectively the output voltage signal together with the inclusion of the amplified signal of the difference between the voltage reference signal and the actual output voltage signal. However, as H(S) is a low-pass filter, it will attenuate the high-frequency signal, such as the switching noise, contained in $v_{ref}$ and $v_o$, and will only respond to the low-frequency variation of $v_o$ which is advantageous.

Figure 9:
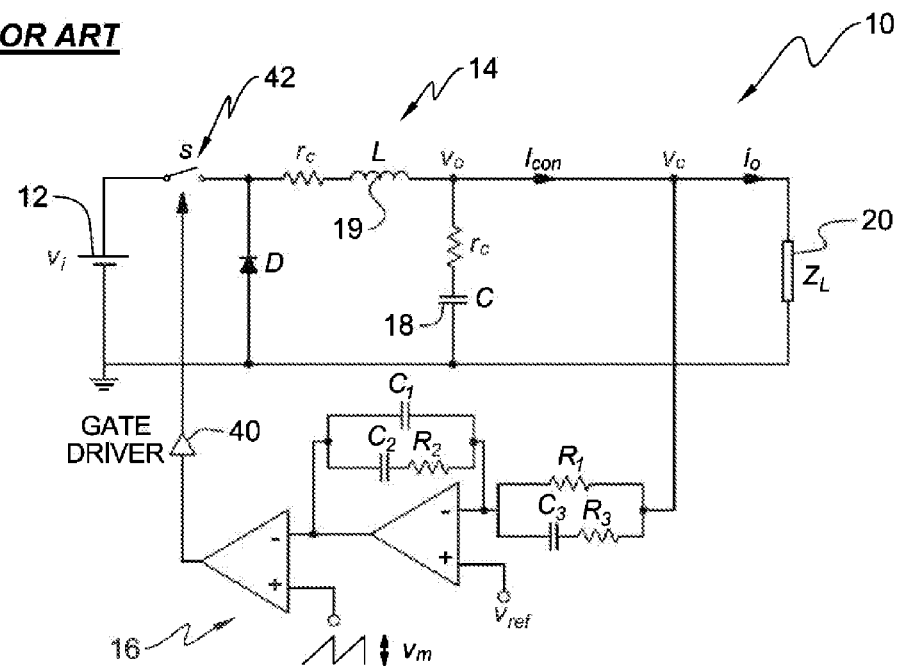
FIG. 9 illustrates in more detail the typical switched type voltage regulator circuit of FIG. 1.

FIG. 9 illustrates in more detail the typical voltage regulator circuit of FIG. 1. In the following description, like numerals to those already employed to describe the typical voltage regulator of FIG. 1 will be used to denote like parts.

The typical voltage regulator 10 of FIG. 9 comprises a power source 12, a power conversion stage (PCS) 14, a controller stage 16 and a passive output component 18. In this example, the passive output component is a capacitor 18 and forms with an inductor 19 an LC output filter. The controller stage 16 senses the output voltage $v_o$ of the voltage regulator 10, compares it with a reference $v_{ref}$ of the voltage regulator, receives some system variables such as inductor current, switch voltage, switch current, etc, and uses these to derive a control signal to command a control variable, typically duty cycle, to the PCS 14, so as to regulate $v_o$ to converge it to $v_{ref}$. The command variable is applied to a gate driver circuit 40 for changing the duty cycle of a switching device 42. The capacitor 18 is connected in parallel with a load impedance '$Z_L$' 20 of the voltage regulator 10.

Figure 10:
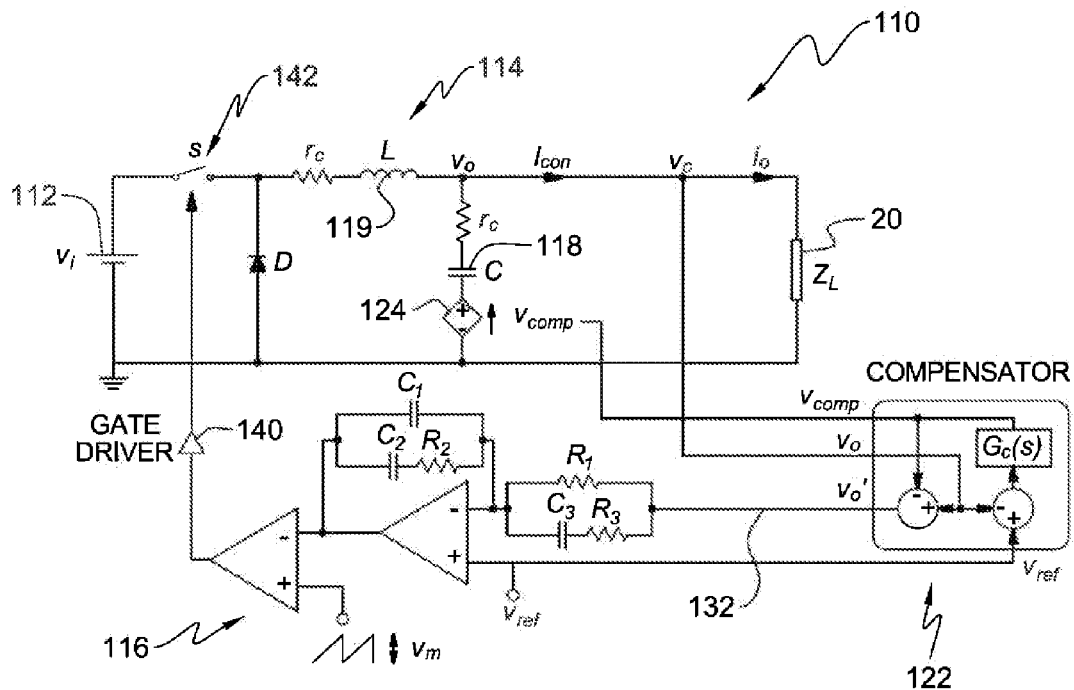
FIG. 10 illustrates how the circuit of the typical switched type voltage regulator circuit of FIG. 9 is modified to connect a dynamic output compensator circuit according to the invention.

FIG. 10 illustrates how the circuit of the typical voltage regulator circuit of FIG. 9 is modified to connect a dynamic output compensator circuit according to the invention. In the following description, like numerals to those already employed to describe the voltage regulator of the first example of the invention depicted by FIGS. 2, 5, 6 and 8 will be used to denote like parts.

The voltage regulator 110 of FIG. 10 comprises a power source $v_i$ 112, a power conversion stage (PCS) 114, a controller stage 116, a compensator circuit 122 and a passive output component comprising a capacitor C 118 (shown in FIG. 10 with its equivalent circuit resistance $r_c$). The capacitor 118 is positioned at an output of the voltage regulator 110 in series with a voltage source 124 of the compensator circuit 122. The capacitor 118 is arranged in parallel with a load impedance '$Z_L$' 120 of the voltage regulator. Together with an inductor 119, the capacitor 118 forms an LC filter circuit at the output of the voltage regulator 110. The capacitor 118 is used to help keep the voltage regulator's output voltage $v_o$ generally constant over time, although an output ripple will usually still be present in the output voltage signal in the absence of any application of a compensation signal from the compensator circuit 122.

One skilled in the art will recognize that FIG. depicts a typical buck voltage regulator circuit and therefore FIG. 10 depicts a typical buck regulator circuit modified to include a compensator circuit according to the invention. As such, a detailed explanation of the original voltage regulator part of the modified buck voltage regulator circuit of FIG. 10 need not be provided in detail here as it will be known to the skilled person.

The compensator circuit 122 is arranged to monitor or sense an output voltage signal $v_o$ across the capacitor 118 and to compare the sensed output voltage signal $v_o$ to a reference voltage signal $v_{ref}$ of the voltage regulator 110. Due to the operation of the capacitor and/or other circuit effects, a ripple voltage signal is often present in the output voltage signal.

The compensator circuit 122 is arranged to derive a difference level signal from the comparison of the reference voltage signal $v_{ref}$ of the voltage regulator to the sensed or monitored output voltage signal $v_o$ of the voltage regulator 110. The compensator circuit 122 is arranged to generate a compensation signal $v_{comp}$ based on said difference level signal and to apply said compensation signal $v_{comp}$ to said capacitor 118. The compensation signal $v_{comp}$ is an inverse of the output voltage signal $v_o$ minus the reference signal $v_{ref}$.

In the voltage regulator arrangement of FIG. 10, the controller stage 116 senses the output voltage $v_o$ of the voltage regulator 110, compares it with a reference $v_{ref}$ of the voltage regulator, receives some system variables such as inductor current, switch voltage, switch current, etc, and uses these to derive a control signal to command a control variable, typically duty cycle, to the PCS 114, so as to regulate $v_o$ to converge it to $v_{ref}$. The command variable is applied to a gate driver circuit 140 for changing the duty cycle of a switching device 142.

It can be seen connection of the compensator circuit 122 to the voltage regulator output stage requires only simple reconnection of the voltage regulator output stage without affecting the feedback control loop 132 of the voltage regulator 110. The controller stage 116 of the voltage regulator 110 still receives the reference voltage signal as one input and the voltage regulator output voltage signal as another input in a similar manner to the typical voltage regulator depicted by FIG. 9.

Figure 11A:
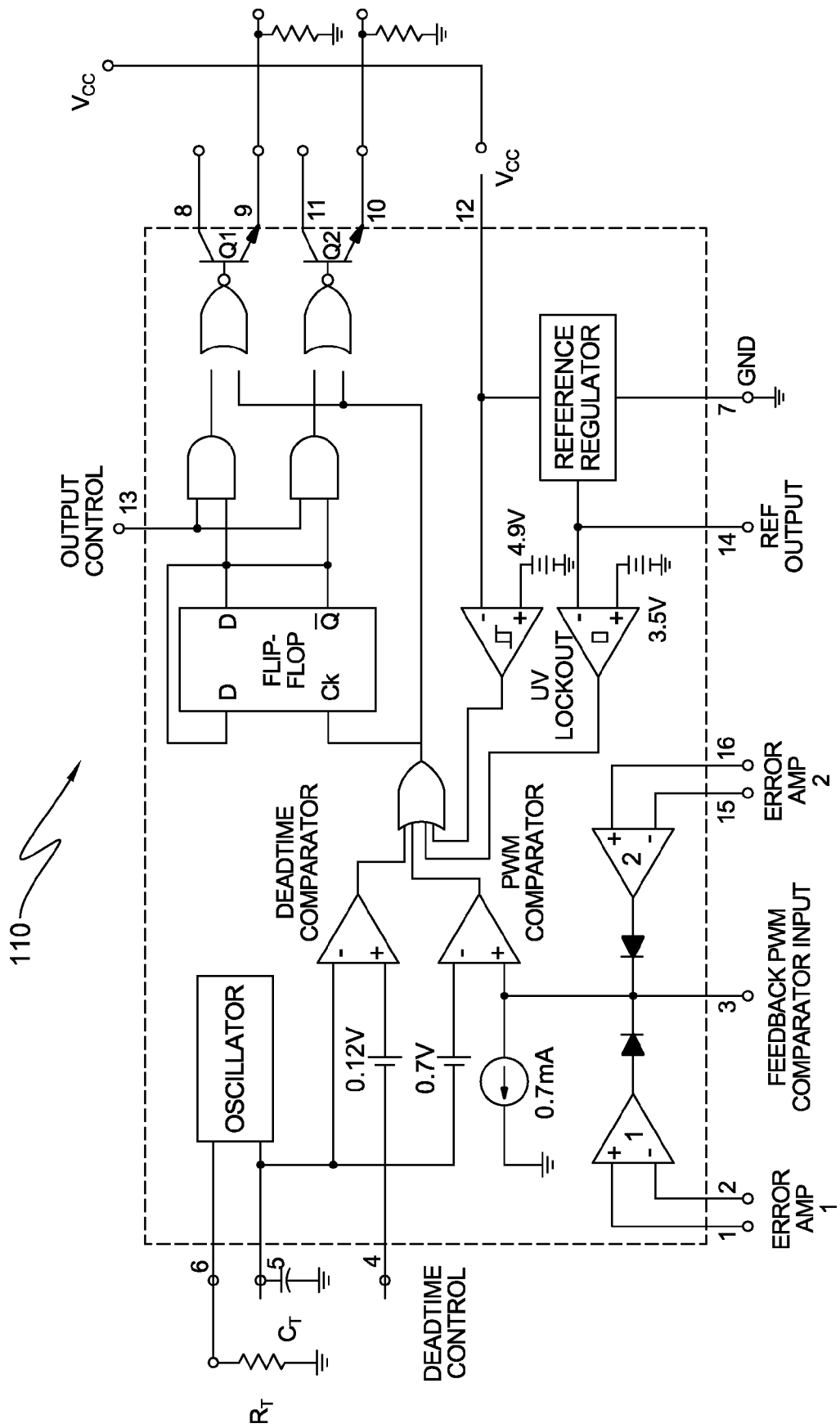
FIGS. 11a to 11e illustrate how a regulator according to the invention minus the compensator circuit (FIG. 11d) is combined with or connected to a compensator circuit according to the invention (FIG. 11e)
Figure 11B:
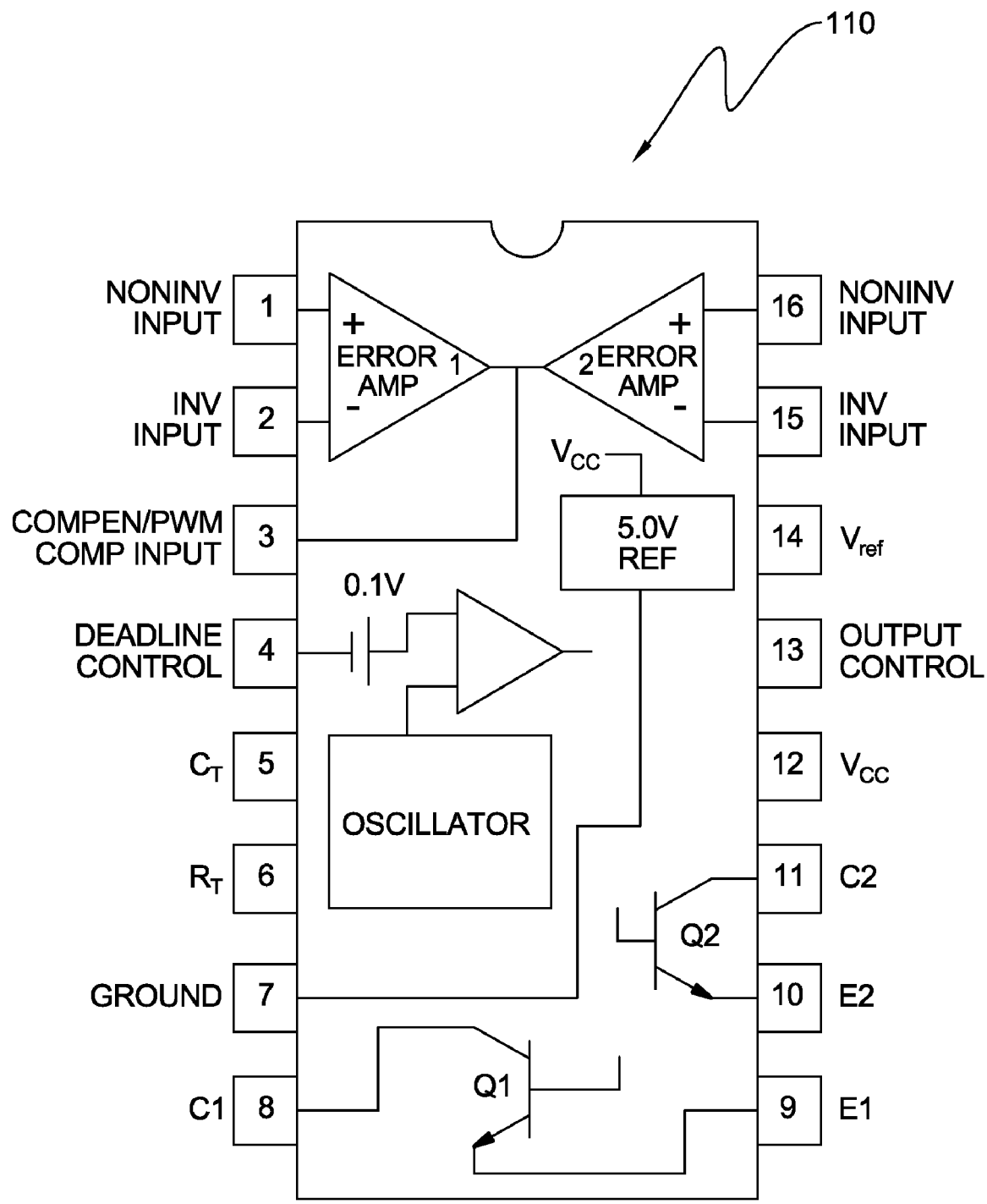
Figure 11C:
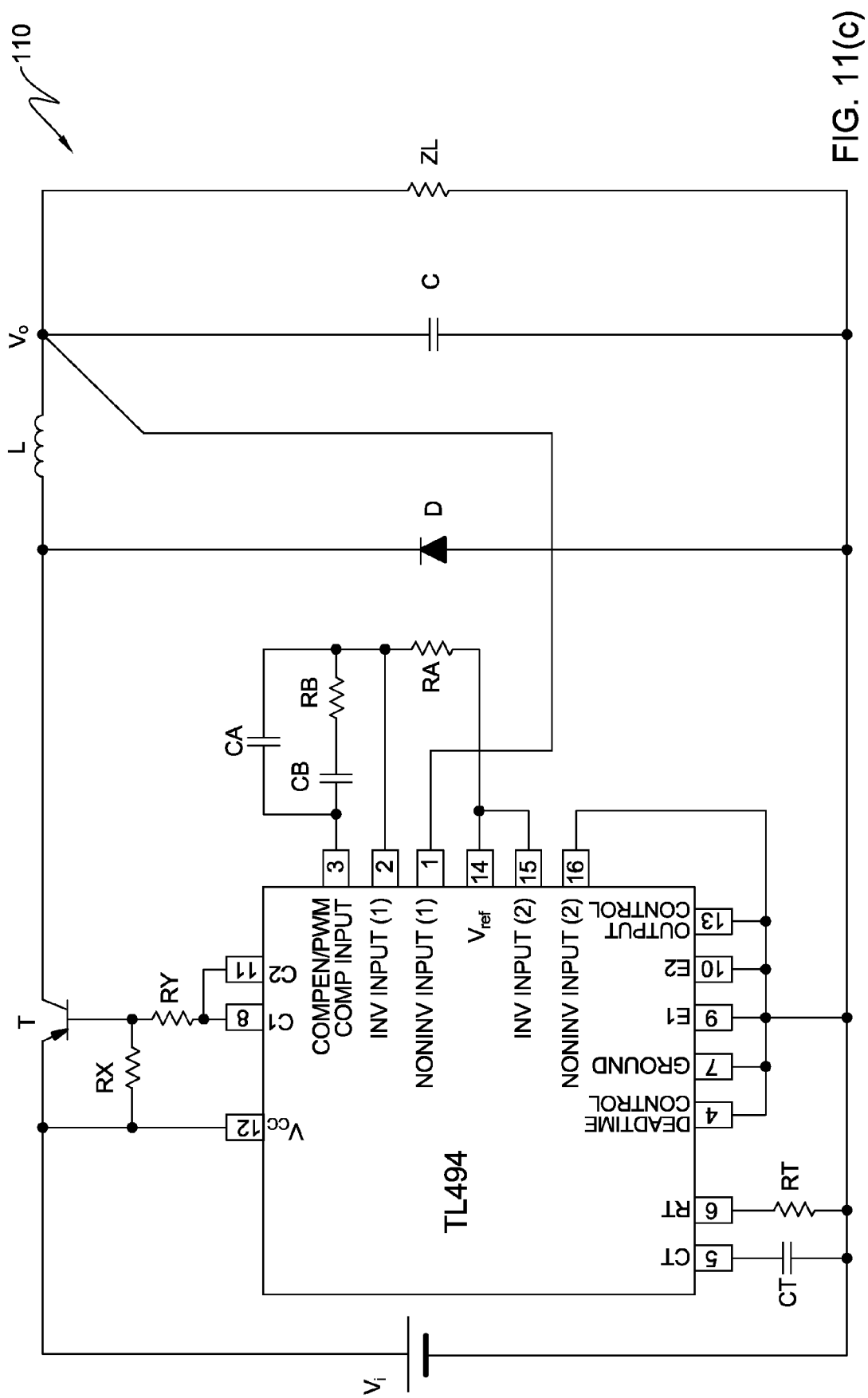
Figure 11D:
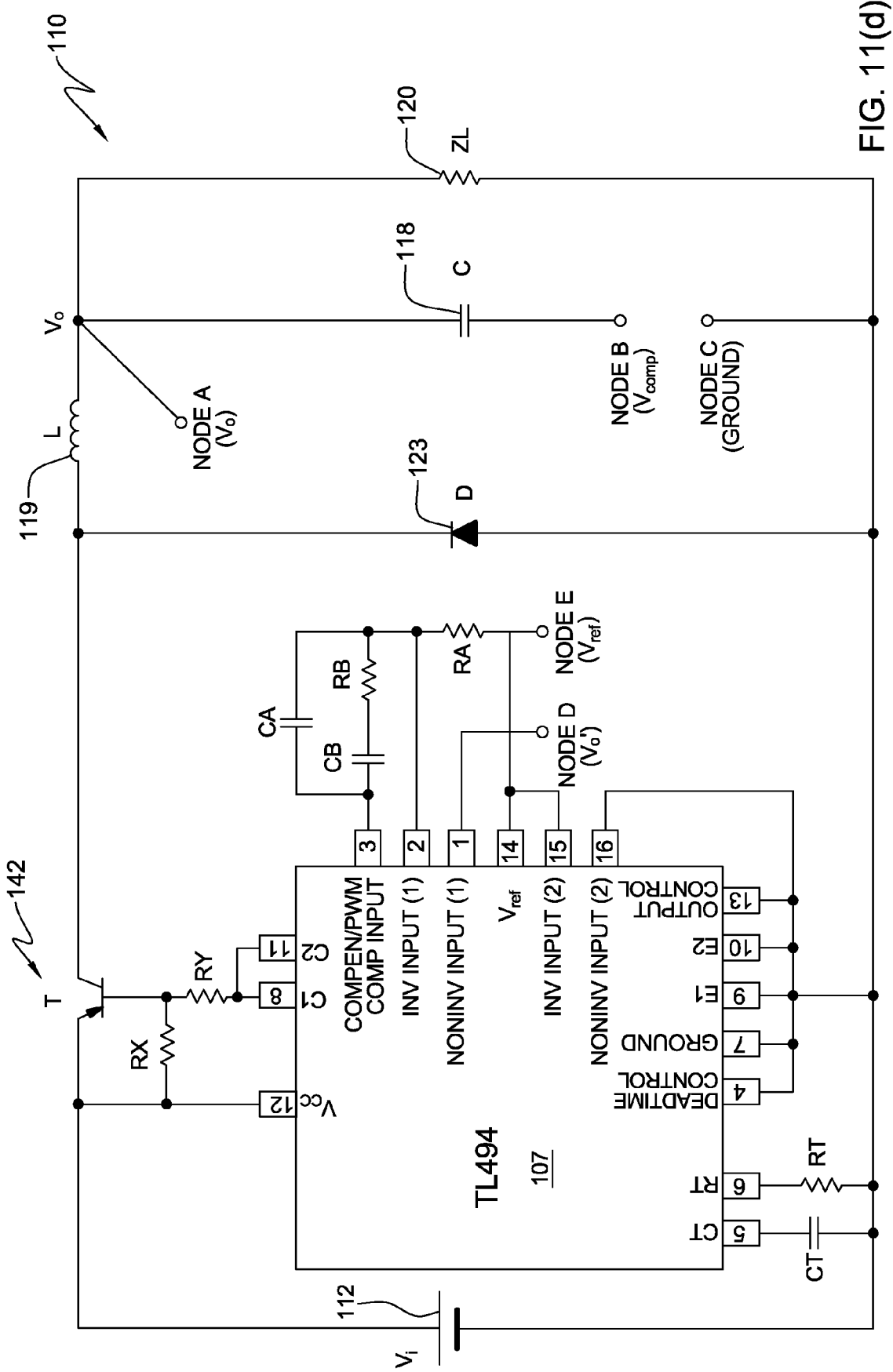
Figure 11E:
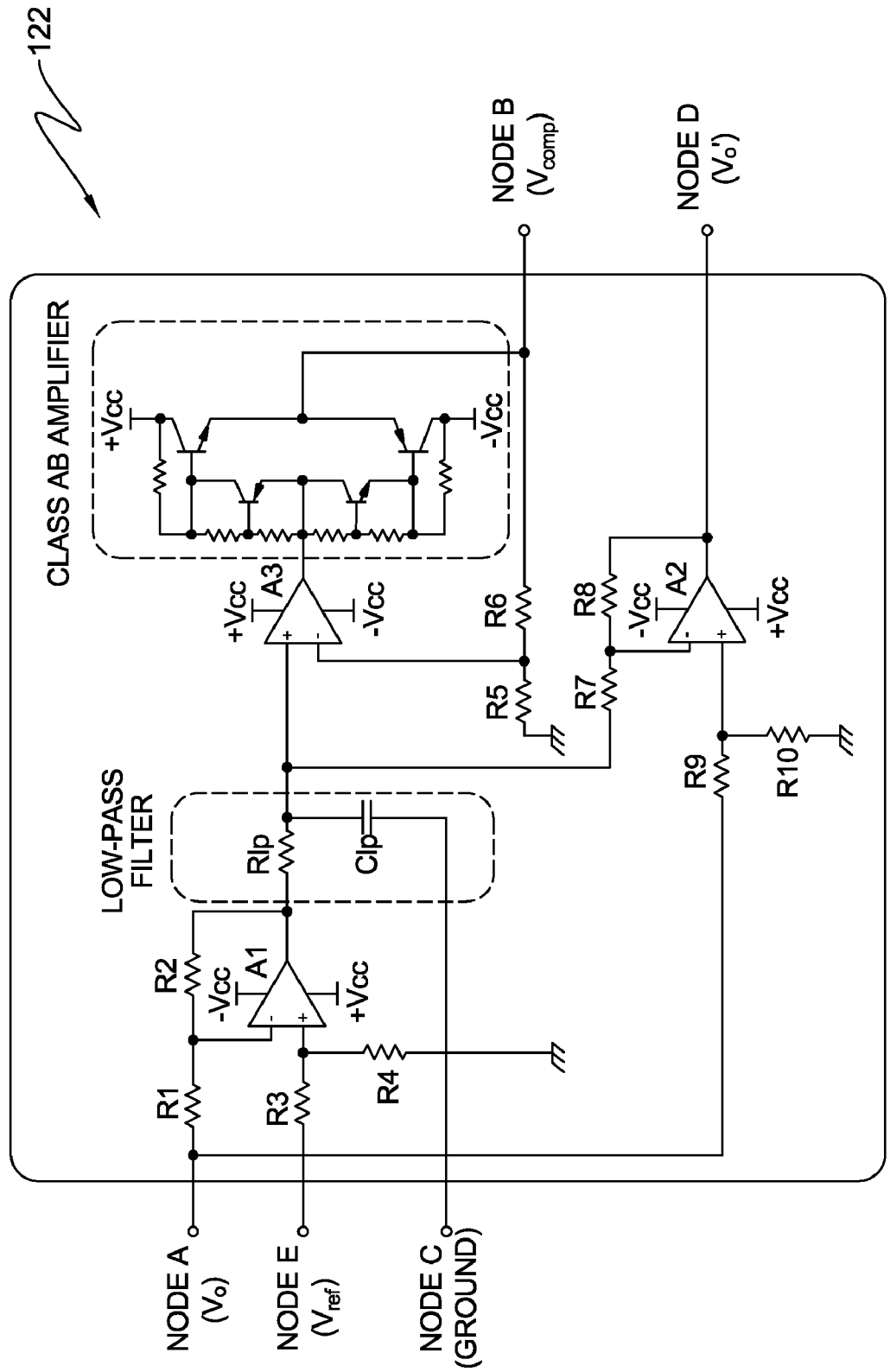

The interconnection of the compensator circuit 122 with the output stage of the voltage regulator is even more clearly illustrated by another example of a voltage regulator of the invention depicted by FIGS. 11a to 11e. FIGS. 11a to 11e illustrate a circuit schematic of said another example of a voltage regulator according to the invention. FIG. 11a shows a block diagram of a Motorola TL494 Switchmode Pulse width Modulation Control Circuit analog IC which forms the basic circuit for the voltage regulator (without any compensation circuitry) according to this further example of the invention. FIG. 11b illustrates the pin connections of this known analog IC circuit. FIG. 11c is a schematic diagram of said known voltage regulator IC circuit minus the compensator circuit. FIG. 11d is also a schematic circuit diagram of said known IC circuit, but illustrating the nodes required for connecting a compensator circuit according to the invention to said IC circuit. FIG. 11e shows the compensator circuit with the required nodes for connecting to the circuit of FIG. 11d to form an output compensated regulator circuit according to the invention. In the following description, like numerals to those already employed to describe the voltage regulator of the first example of the invention depicted by FIGS. 2, 5, 6, 8 and 10 will be used to denote like parts.

The compensator circuit 122 of FIG. 11e has been applied to a known 7 W voltage-mode buck regulator as shown in FIGS. 11a to 11d, but modified to include nodes A to E to enable easy connection to respective nodes of the regulator circuit as particularly seen in FIG. 11d.

As already indicated, the voltage regulator 110 is modified to include nodes A to E for connection to respective nodes of the compensator circuit.

The power conversion stage (PCS) 116 of the regulator of FIGS. 11a to 11e comprises a switching device 142 in the form of a transistor, a diode 123, filter inductor 119 and a filter capacitor 118. Vi 112 is the source and ZL 120 is the load impedance. Pins 8 and 11 of the controller integrated circuit TL494 107 provide the gate signal to the switching element 142 through the resistive network comprising RX and RY. An error amplifier provided by pins 15 and 16 of the IC circuit device 107 is inhibited by connecting pin 15 to the reference voltage Vref and pin 16 to ground. Only an error amplifier formed by pins 1 and 2 is used.

The capacitor CT and resistor and RT connected to pin 5 and pin 6, respectively, determine the operating frequency of the voltage regulator. The resistors, RA and RB, and capacitors, CA and CB, are connected to the error amplifier provided by pins 15 and 16 to form a Type-II feedback network. The values of the components are designed, for example, by following the method described in "Doug Mattingly, "Designing Stable Compensation Networks for Single Phase Voltage Mode Buck Regulators," *Intersil Technical Brief TB* 417.1, December 2003," incorporated herein by reference.

The output voltage Vo of the regulator is connected to pin 1—the non-inverting input of the error amplifier (1). The error amplifier compares Vo with the voltage reference Vref and generates the error signal output at pin 3. After subsequent operation of pulsewidth modulation inside the controller, the controller will give the gate signal to pins 8 and 11, i.e., C1 and C2, for driving the transistor T, so that Vo will be regulated to Vref.

FIG. 11d depicts how the voltage regulator is modified and connected to the compensator circuit in FIG. 11e. First, Vo is disconnected from pin 1 to create Node A and Node D. Second, the filter capacitor C 118 is disconnected from the ground of the regulator to create Node B and Node C. Finally, Node E is the voltage reference Vref of the controller. Node C is the actually the common ground of the voltage regulator and compensator circuit.

The operation of the combined circuit (the circuits of FIGS. 11d and 11e) is described as follows. The compensator circuit computes the difference between Vo and Vref with the subtractor formed by A1, R1, R2, R3, R4. After filtering the high-frequency noise by the low-pass filter formed by Rlp and Clp, the output goes to the input of a voltage amplifier formed by A3, a class AB amplifier, and the feedback resistors R5 and R6. The voltage amplifier injects required voltage Vcomp at Node B to compensate the difference between Vo and Vref. Meanwhile, Vo is subtracted from Vcomp by using the subtractor formed by A2, R7, R8, R9, and R10, to give the output Vo' at Node D. If no compensation is needed, Vcomp is zero and Vo is equal to Vo'.

Figure 12:
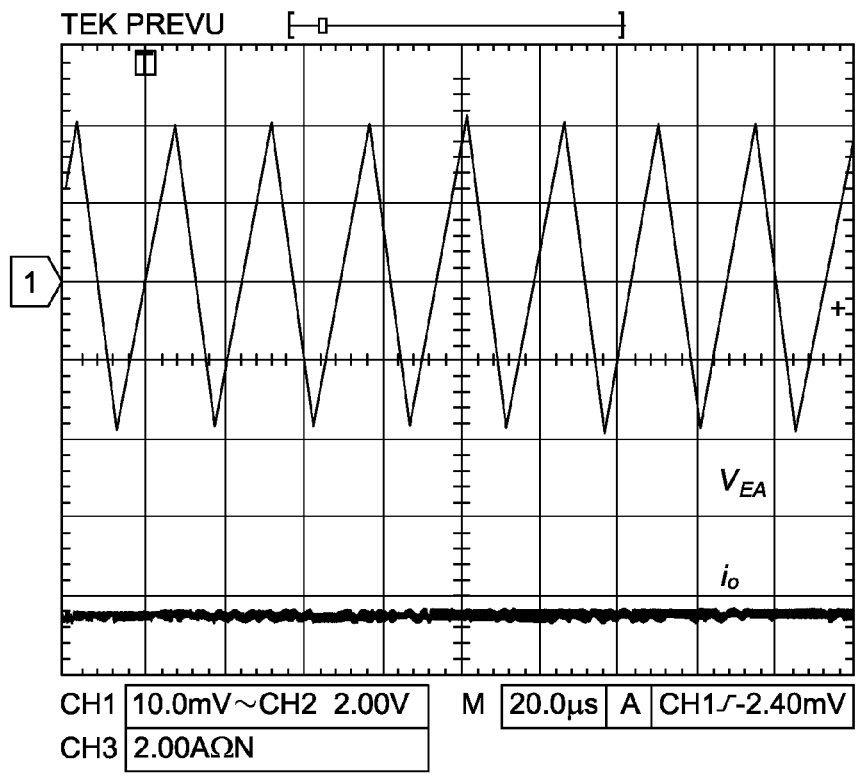
FIGS. 12a and 12b are plots of results of the output signal of the regulator of FIGS. 11a to 11e with and without compensation under certain conditions.
Figure 12:
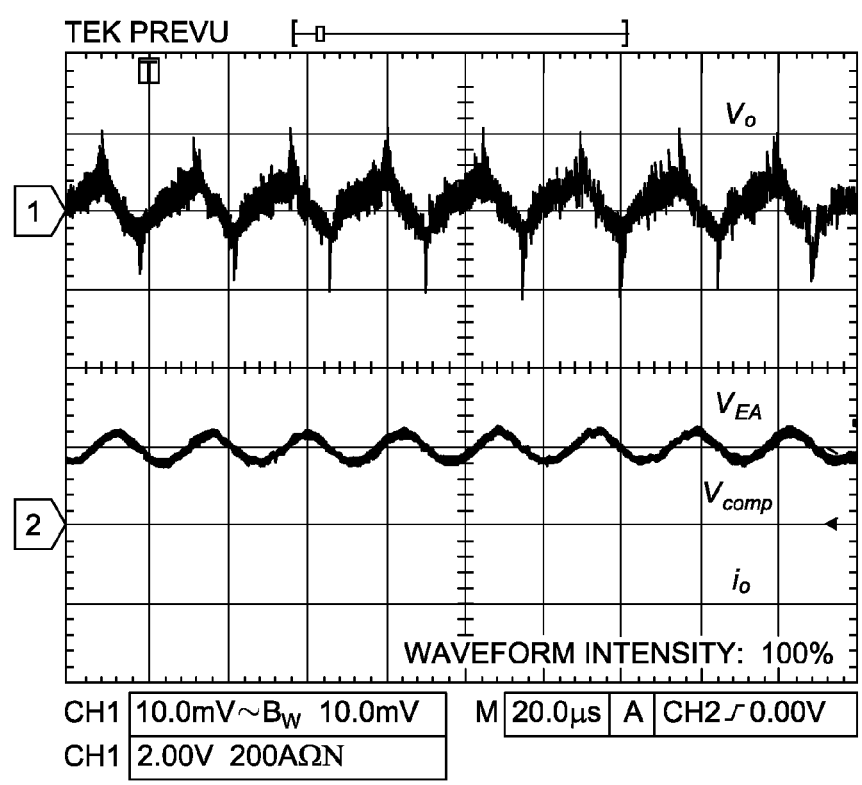
Figure 13:
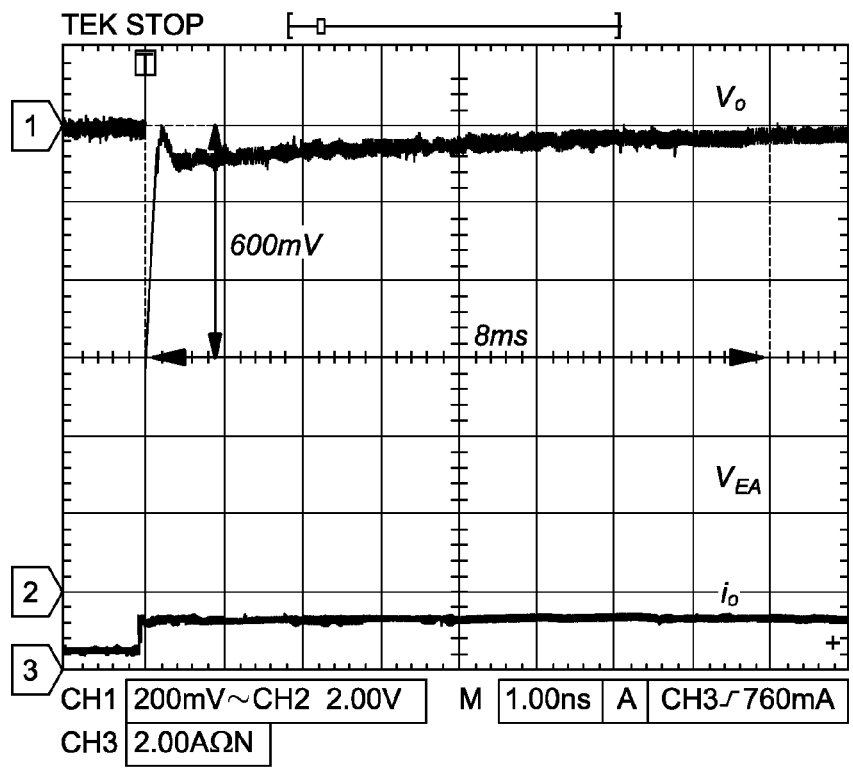
FIGS. 13a and 13b are plots of results of the output signal of the regulator of FIGS. 11a to 11e with and without compensation under certain conditions different to those of FIGS. 12a and 12b.
Figure 13:
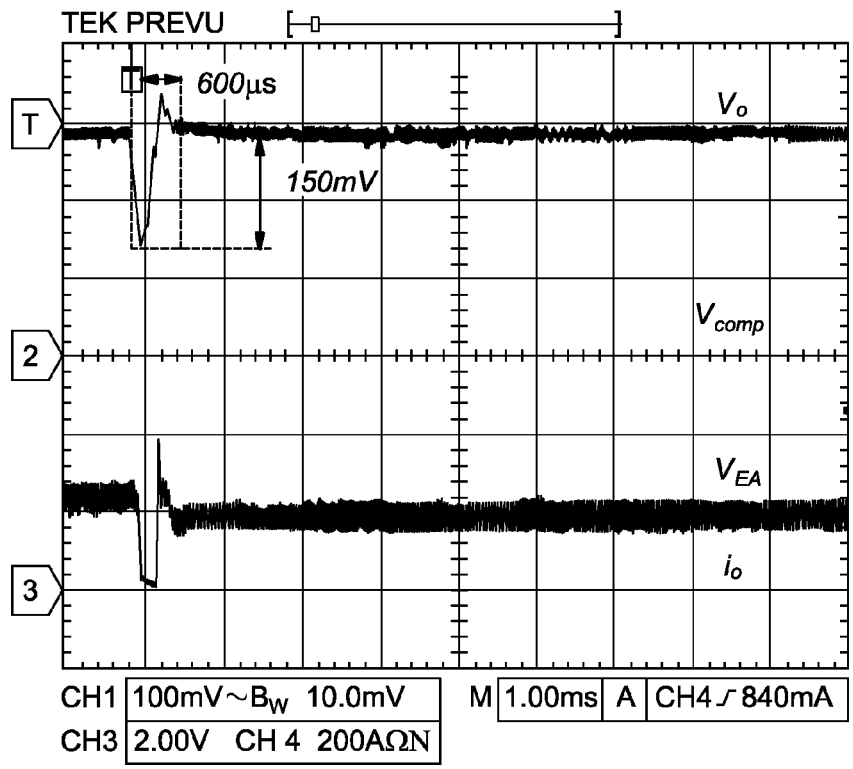
Figure 14:
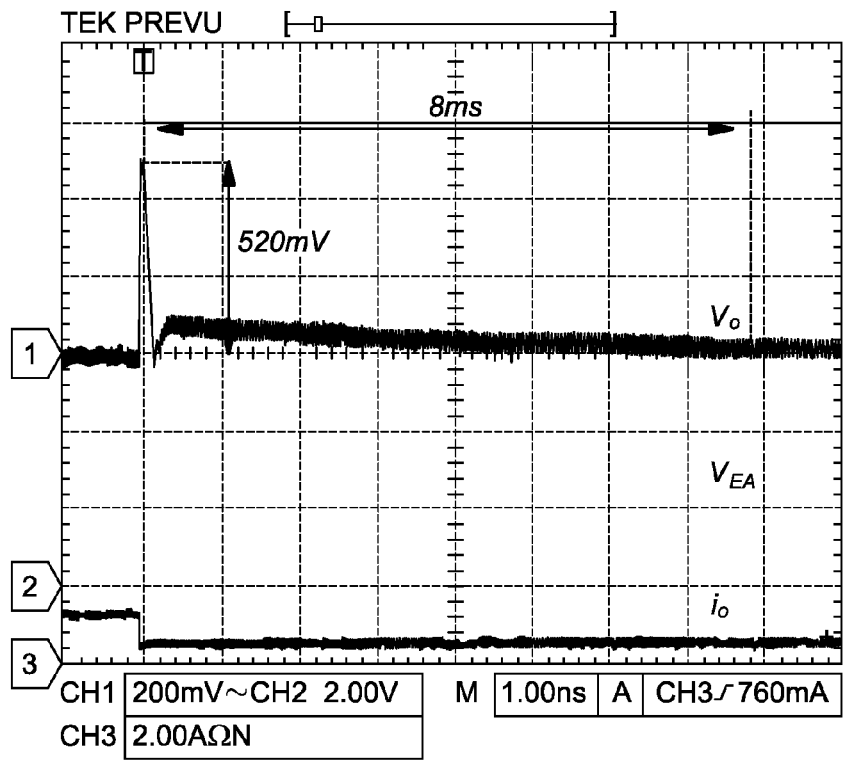
FIGS. 14a and 14b are plots of results of the output signal of the regulator of FIGS. 11a to 11e with and without compensation under certain conditions different to those of FIGS. 12a and 12b and FIGS. 13a and 13b.
Figure 14:
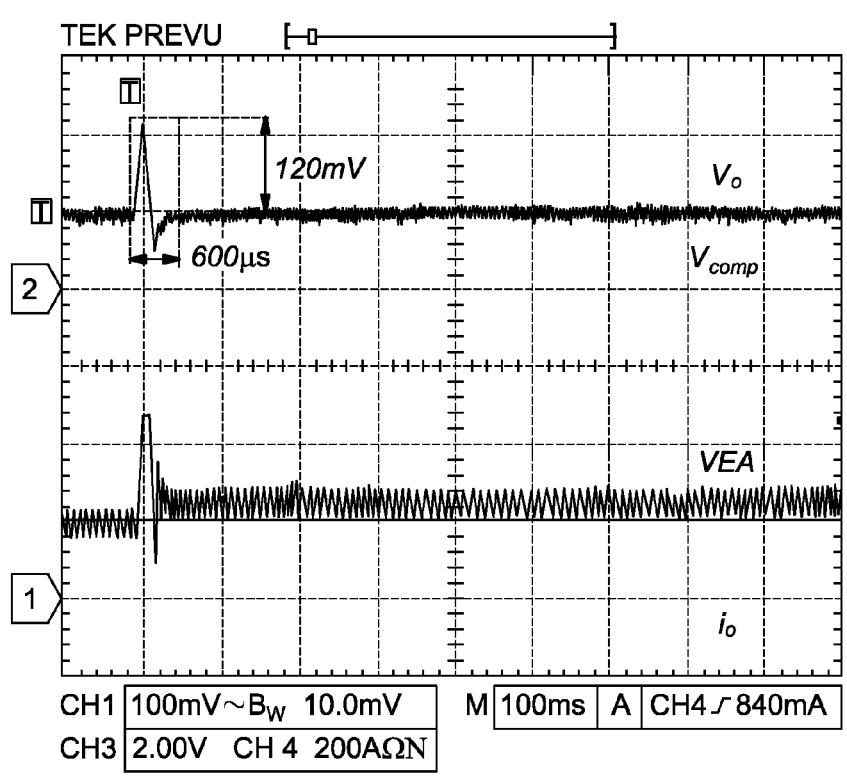

FIGS. 11a to 11e represent a physical example of the voltage regulator of the invention that has been subjected to experimentation. $G_c$ is a first-order low-pass filter formed by Rlp and Clp in FIG. 6(b). The steady-state and transient behaviors of the regulator has been studied. FIGS. 12 to 14 show the output voltage waveforms $v_o$, control signals of the controller $v_{EA}$ load current $i_o$, and compensator output $v_{comp}$ with and without the compensator.

In FIG. 12 shows a steady state waveform at heavy load using a timebase of 20 μs with $v_o$-10 mV/div, $v_{EA}$=2V/div, $v_{comp}$=50 mV/div and $i_o$=2 A/div. The output was a heavy load of 3Ω. The compensator was able to reduce the voltage ripple from 40 $mV_{pk\text{-}pk}$ to 10 $mV_{pk\text{-}pk}$.

In FIG. 13, the load resistance is changed from 10Ω to 3Ω, the settling time is reduced from 8 ms to 600 μs and the undershoot is reduced from 600 mV to 150 mV with the compensator. The timebase was 20 μs with $v_{EA}$=2V/div, $v_{comp}$=500 mV/div and $i_o$=2 A/div.

In FIG. 14, the load resistance was changed from 3Ω to 10Ω, the settling time was also reduced from 8 ms to 600 μs and the overshoot was reduced from 520 mV to 120 mV with the compensator. The timebase was 20 μs with $v_{EA}$=2 V/div, $v_{comp}$=500 mV/div and $i_o$=2 A/div.

Finally, as shown in FIGS. 12 to 14, $v_{comp}$, was kept at very low voltage, except during the transient moment. The required power was very low, which is 0.25 W in this example. The waveforms of $v_{EA}$ with and without the compensator are almost the same, confirming the foregoing analysis.

FIGS. 11 through to 14 demonstrate the ability of the present invention to at least provide a compensator circuit for a voltage regulator having: means for sensing an output voltage signal at a passive component at an output of the voltage regulator; means for generating a compensating signal based on a difference signal, said difference signal comprising a difference between a level of a reference voltage signal for the voltage regulator and the sensed output voltage signal; and means for applying said compensating signal to said passive output component to reduce said difference between the level of the reference voltage signal and the sensed output voltage signal.

Furthermore, FIGS. 11 to 14 provide at least a method of forming a voltage regulator having a power conversion stage and a controller circuit having means for sensing an output voltage signal of the voltage regulator and comparing it to a reference voltage signal of the voltage regulator to generate a control signal for controlling the power conversion stage so as to regulate the output voltage signal of the voltage regulator to converge to a level of the reference voltage signal, the method comprising: providing an output compensator circuit having: an input for receiving said reference voltage signal from the voltage regulator; an input for receiving said sensed output voltage signal of the voltage regulator; within said compensator circuit, generating a compensating signal based on a difference signal, said difference signal comprising a difference between a level of the reference voltage signal for the voltage regulator and the sensed output voltage signal; and connecting an output of said compensator circuit to a passive component at the output of said voltage regulator in order to apply said compensating signal to said output passive component to thereby reduce said difference between the level of the reference voltage signal and the sensed output voltage signal.

Furthermore, FIGS. 11 to 14 provide at least a compensator circuit for a voltage regulator comprising: an input for receiving a reference voltage signal from the voltage regulator; an input for receiving a sensed output voltage signal of the voltage regulator; a signal generating circuit for generating a compensating signal based on a difference signal, said difference signal comprising a difference between a level of the reference voltage signal for the voltage regulator and the sensed output voltage signal; and an output for connecting to a passive component at the output of said voltage regulator in order to apply said compensating signal to said output passive component to thereby reduce said difference between the level of the reference voltage signal and the sensed output voltage signal.

Figure 15:
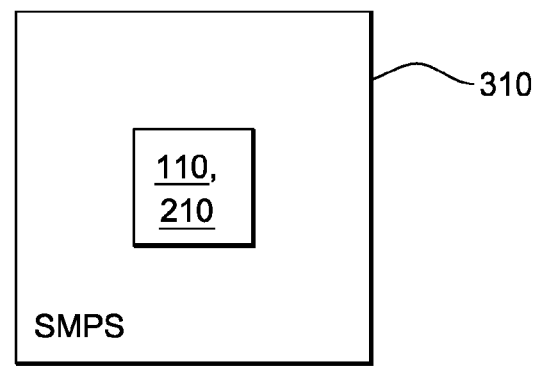
FIG. 15 comprises an example of a switched-mode power supply according to the invention.

FIG. 15 comprises a switched-mode power supply 310 having a voltage regulator 110, 210 according to any of the examples of the invention for regulating an output power supply signal of the voltage regulator according to a reference voltage signal applied to the voltage regulator 110, 210 for providing said regulated output power supply signal to at least one component of the switched-mode power supply 310.

Figure 16:
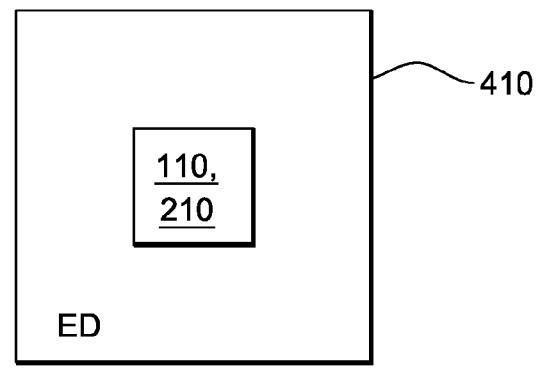
FIG. 16 comprises an example of an electronic device according to the invention.

FIG. 16 comprises an electronic device 410 having a voltage regulator 110, 210 according to any of the examples of the invention for regulating an output power supply signal of the voltage regulator according to a reference voltage signal applied to the voltage regulator 110, 210 for providing said regulated output power supply signal to at least one component of the electronic device 410. The electronic device can comprise any known type of device that employs a voltage regulator, but is preferably embodied in a mobile communications device, a laptop computer, a personal digital assistant or the like.

Figure 17:
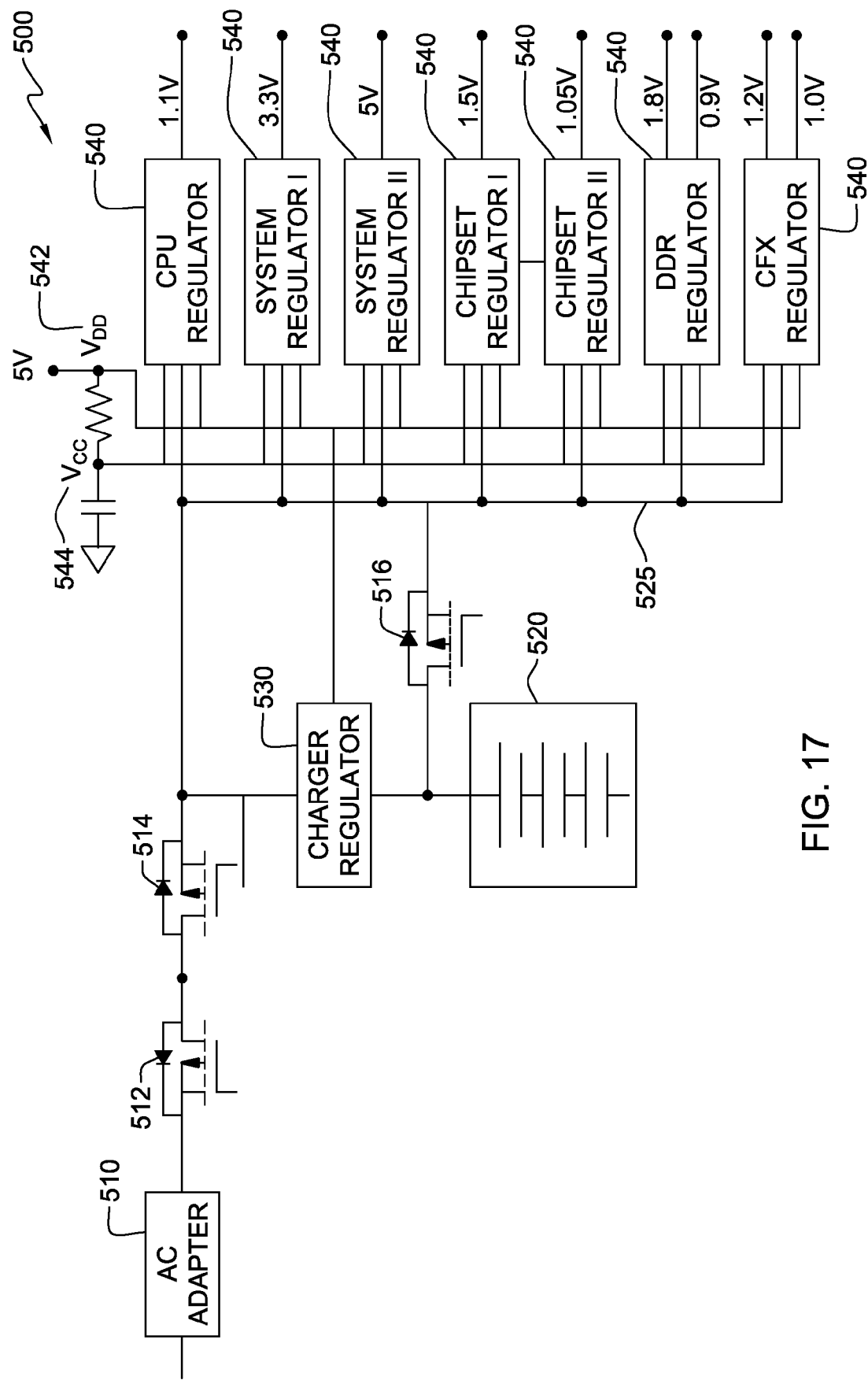
FIG. 17 comprises an example of another power supply according to the invention.

Referring to FIG. 17, battery supported power supplies are used for a variety of applications. Often a battery power supply must be regulated prior to being utilized in a system. For example, in an exemplary system 500 of FIG. 17, an AC power source may be obtained from an AC adaptor 510 which may be coupled, for example, to a public AC power grid. A battery 520 is also provided to provide a battery power source. Switches 512, 514, and 516 and charger regulator 530 may be provided to select AC power from the AC adapter 510 or battery power from the battery 520 to provide the power for the supply rail Vin 525. The switches may also be controlled to provide charging of the battery. The power supply rail Vin 525 may be provided to a number of voltage regulators 540, at least one of said voltage regulators comprising a voltage regulator in accordance with any of the examples of the invention.

In typical applications the rail Vin 525 may have a wide voltage range. For example, when the AC adaptor 110 is being utilized the nominal input voltage level of Vin 125 may high compared to the battery voltage supply. However when the power supply system is supported by the battery, the minimum input voltage level may be as low as that provided by the battery power supply. The voltage regulators 140 convert the voltage level of the rail Vin 125 to the necessary voltages required by battery supported power system loads such as processor, chipsets, double data rate (DDR) memory and graphics cards. For example as shown in FIG. 17 the voltage regulators 540 are used to provide a number of regulated power supply rails. The number, types, and output voltage levels of the regulators shown in FIG. 17 are merely exemplary and may vary depending upon a user's application and needs. One exemplary type of regulator is a general switching voltage regulator where Metal Oxide Silicon Field Effect Transistor (MOSFET) is used as power control switch. In one exemplary example the voltage regulators may be "buck" voltage regulators. Buck or "step-down" voltage regulators are regulators that are generally known to have an output voltage that is lower than an input voltage. Exemplary voltage regulators use controllers such as the Intersil ISL88550A, Maxim MAX8743 and the Texas Instrument TPS51116. The exemplary voltage regulators have a common feature that two auxiliary +5V power supply voltages are needed to support drive circuitry and control circuitry operations in the controller. Of these two power supply voltages, a +5V supply voltage called VCC or AVDD is the one after a RC filter.

As shown in FIG. 17, the voltage regulators may receive power supply inputs in addition to the power circuitry input Vin rail that is being regulated. Thus, for example, as shown a Vdd supply input 542 may be utilized and a Vcc supply input 544 filtered by a RC filter after Vdd may also be utilized. The Vdd supply input 542 may act as a power supply for the MOSFET gate drive circuitry and the Vcc supply input 544 may act as a power supply for the analog and/or digital control circuitry within the regulator.

Consequently, FIG. 17 provides at least a dual power source regulated power supply having at least one voltage regulator according to the invention.

Whilst many of the examples hereinbefore described relate to voltage regulators, it will be understood, as illustrated by the current regulator example of FIG. 4, that the various circuit arrangements of the examples depicting voltage regulators are equally applicable to current regulators and thus such examples are considered as also comprising current regulators replacing said voltage regulators.

In summary, there is provided an output compensator for a regulator that can improve the dynamic response of a regulator, but which does not require the redesigning of the power conversion stage or control stage of the regulator, but simple circuit connection of the compensator circuit to the output stage of the regulator. The compensator has means for sensing an output signal at a passive component at an output of the regulator; means for generating a compensating signal based on a difference signal, said difference signal comprising a difference between a level of a reference signal for the regulator and the sensed output signal; and means for applying said compensating signal to said passive output component to reduce said difference between the level of the reference signal and the sensed output signal. The passive output component comprises a capacitor or an inductor depending on the operation of the regulator.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A method of compensating an output signal of a regulator, comprising the steps of:
    sensing an output signal at a passive component at an output of the regulator;
    generating a ripple compensating signal based on a difference signal, said difference signal comprising a difference between a level of a reference signal for the regulator and the sensed output signal; and
    applying said ripple compensating signal to said passive component to thereby reduce a ripple signal comprising said difference between the level of the reference signal and the sensed output signal to provide a compensated output signal for the regulator,
    wherein a compensator circuit for generating the ripple compensating signal does not have to process a whole of an output load power of the regulator.

2. The method of claim 1, wherein the step of generating the ripple compensating signal includes amplifying the difference signal.

3. The method of claim 1, wherein the sensed output signal comprises a voltage signal sensed across an output capacitor component of said regulator, said output capacitor component being arranged in parallel with an output load impedance of said regulator, and said ripple compensating signal comprises a voltage compensation signal applied in series to said output capacitor component.

4. The method of claim 3, wherein the voltage compensation signal is provided by a linear-type voltage source or a switching-type voltage source.

5. The method of claim 1, wherein the sensed output signal comprises a signal sensed at an output of an output inductor component of said regulator, said output inductor component being arranged in series with an output load impedance of said regulator, and the ripple compensating signal comprises a current compensation signal applied in parallel to said output inductor component.

6. The method of claim 5, wherein the current compensation signal is provided by a linear-type current source.

7. The method of claim 1, wherein the regulator comprises a linear type voltage or current regulator or a switched type voltage or current regulator.

8. The method of claim 1, wherein the ripple compensating signal is applied to the output passive component following a reference signal feedback loop of the regulator.

9. A regulator comprising:
a power conversion stage;
a controller circuit having means for sensing an output signal of the regulator and comparing it to a reference signal of the regulator to generate a control signal for controlling the power conversion stage so as to regulate the output signal of the regulator to converge to a level of the reference signal; and
a compensator circuit having:
means for sensing an output signal at a passive component at the output of the regulator;
means for generating a ripple compensating signal based on a difference signal, said difference signal comprising a difference between a level of said reference signal and the sensed output signal; and
means for applying said ripple compensating signal to said passive component to thereby reduce a ripple signal comprising said difference between the level of the reference signal and the sensed output signal to provide a compensated output signal for the regulator, wherein the compensator circuit is configured such that said compensator circuit does not have to process a whole of an output load power of the regulator.

10. The regulator of claim 9, wherein the means for generating the ripple compensating signal is arranged to amplify the difference signal.

11. The regulator of claim 9, wherein the sensed output signal comprises a voltage signal sensed across an output capacitor component of said regulator, said output capacitor component being arranged in parallel with an output load impedance of said regulator, and said ripple compensating signal comprises a voltage compensation signal applied in series to said output capacitor component.

12. The regulator of claim 9, wherein the sensed output signal comprises a signal sensed at an output of an output inductor component of said regulator, said output inductor component being arranged in series with an output load impedance of said regulator, and the ripple compensating signal comprises a current compensation signal applied in parallel to said output inductor component.

13. The regulator of claim 9, wherein the regulator comprises a linear type voltage or current regulator or a switched type voltage or current regulator.

14. The regulator of claim 9, wherein the ripple compensating signal is applied to the output passive component following a reference signal feedback loop of the regulator.

15. The regulator of claim 9, wherein the regulator comprises part of a switched mode power supply.

16. A compensator circuit for a regulator having:
means for sensing an output signal at a passive component at an output of the regulator;
means for generating a ripple compensating signal based on a difference signal, said difference signal comprising a difference between a level of a reference signal for the regulator and the sensed output signal; and
means for applying said ripple compensating signal to said passive component to thereby reduce a ripple signal comprising said difference between the level of the reference signal and the sensed output signal,
wherein the compensator circuit is configured such that said compensator circuit does not have to process a whole of an output load power of the regulator.

17. A method of forming a regulator having a power conversion stage and a controller circuit having means for sensing an output signal of the regulator and comparing it to a reference signal of the regulator to generate a control signal for controlling the power conversion stage so as to regulate the output signal of the regulator to converge to a level of the reference signal, the method comprising:
providing an output compensator circuit having: an input for receiving said reference signal from the regulator; an input for receiving said sensed output signal of the regulator;
within said output compensator circuit, generating a ripple compensating signal based on a difference signal, said difference signal comprising a difference between a level of the reference signal for the regulator and the sensed output signal; and
connecting an output of said output compensator circuit to a passive component at the output of said regulator in order to apply said ripple compensating signal to said passive component to thereby reduce a ripple signal comprising said difference between the level of the reference signal and the sensed output signal,
wherein the output compensator circuit is configured such that said output compensator circuit does not have to process a whole of an output load power of the regulator.

18. A compensator circuit for a regulator comprising:
an input for receiving a reference signal from the regulator;
an input for receiving a sensed output signal of the regulator;
a signal generator circuit for generating a ripple compensating signal based on a difference signal, said difference signal comprising a difference between a level of the reference signal for the regulator and the sensed output signal; and
an output for connecting to a passive component at the output of said regulator in order to apply said ripple compensating signal to said passive component to thereby reduce a ripple signal comprising said difference between the level of the reference signal and the sensed output signal,
wherein the compensator circuit is configured such that said compensator circuit does not have to process a whole of an output load power of the regulator.

19. A switched mode power supply having a regulator according to claim 9.

20. An electronic device having at least one regulator according to claim 9.

21. A dual source power supply having at least one regulator according to claim 9.

* * * * *